United States Patent
Tashiro

(10) Patent No.: US 10,126,523 B2
(45) Date of Patent: Nov. 13, 2018

(54) ZOOM LENS AND IMAGE PICKUP APPARATUS HAVING THE SAME

(71) Applicant: CANON KABUSHIKI KAISHA, Tokyo (JP)

(72) Inventor: Yoshihisa Tashiro, Nikko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/646,492

(22) Filed: Jul. 11, 2017

(65) Prior Publication Data

US 2018/0024314 A1 Jan. 25, 2018

(30) Foreign Application Priority Data

Jul. 19, 2016 (JP) .................. 2016-141002

(51) Int. Cl.
 G02B 15/14 (2006.01)
 G02B 9/60 (2006.01)
 G02B 7/02 (2006.01)
 G02B 7/04 (2006.01)
 G02B 13/02 (2006.01)
 G02B 13/06 (2006.01)
 G02B 17/00 (2006.01)
 G03B 5/00 (2006.01)
 (Continued)

(52) U.S. Cl.
 CPC .............. G02B 9/60 (2013.01); G02B 7/021 (2013.01); G02B 7/04 (2013.01); G02B 13/02 (2013.01); G02B 13/06 (2013.01); G02B 15/167 (2013.01); G02B 15/173 (2013.01); G02B 17/00 (2013.01); G03B 5/00 (2013.01); G03B 2205/0046 (2013.01)

(58) Field of Classification Search
 CPC .......... G02B 9/60; G02B 17/00; G02B 7/021; G02B 13/02; G02B 13/06; G02B 7/04; G03B 5/00; G03B 2205/0046
 See application file for complete search history.

(56) References Cited

U.S. PATENT DOCUMENTS 8,824,061 B2 9/2014 Tomioka
8,854,504 B2 10/2014 Tashiro
(Continued)

FOREIGN PATENT DOCUMENTS

WO 2012/077338 A1 6/2012

*Primary Examiner* — Alicica M Harrington
(74) *Attorney, Agent, or Firm* — Carter, DeLuca, Farrell & Schmidt, LLP

(57) ABSTRACT

A zoom lens includes, in order from an object side to an image side, first to fifth lens units respectively having positive, negative, positive, positive, and negative refractive powers. The first lens unit does not move for zooming, and each of the distances between the lens units adjacent to each other is changed during zooming. Lateral magnifications β2w and β2t of the second lens unit at a wide angle end and a telephoto end, respectively, lateral magnifications β3w and β3t of the third lens unit at the wide angle end and the telephoto end, respectively, lateral magnifications β4w and β4t of the fourth lens unit at the wide angle end and the telephoto end, respectively, a focal length f5 of the fifth lens unit, and an amount of movement M5 of the fifth lens unit in zooming from the wide angle end to the telephoto end are appropriately set.

14 Claims, 11 Drawing Sheets

(51) Int. Cl.
*G02B 15/173* (2006.01)
*G02B 15/167* (2006.01)

(56) References Cited

U.S. PATENT DOCUMENTS 9,904,043 B2 * 2/2018 Shimomura ......... G02B 15/173
2013/0342749 A1 12/2013 Tashiro

* cited by examiner

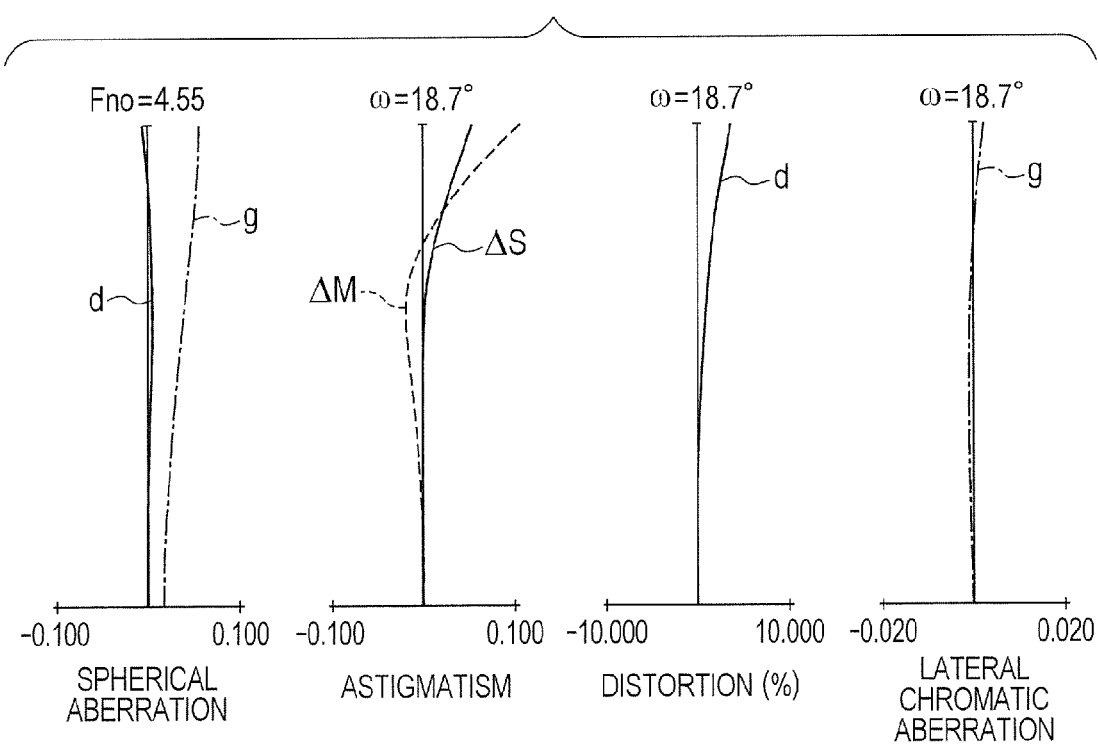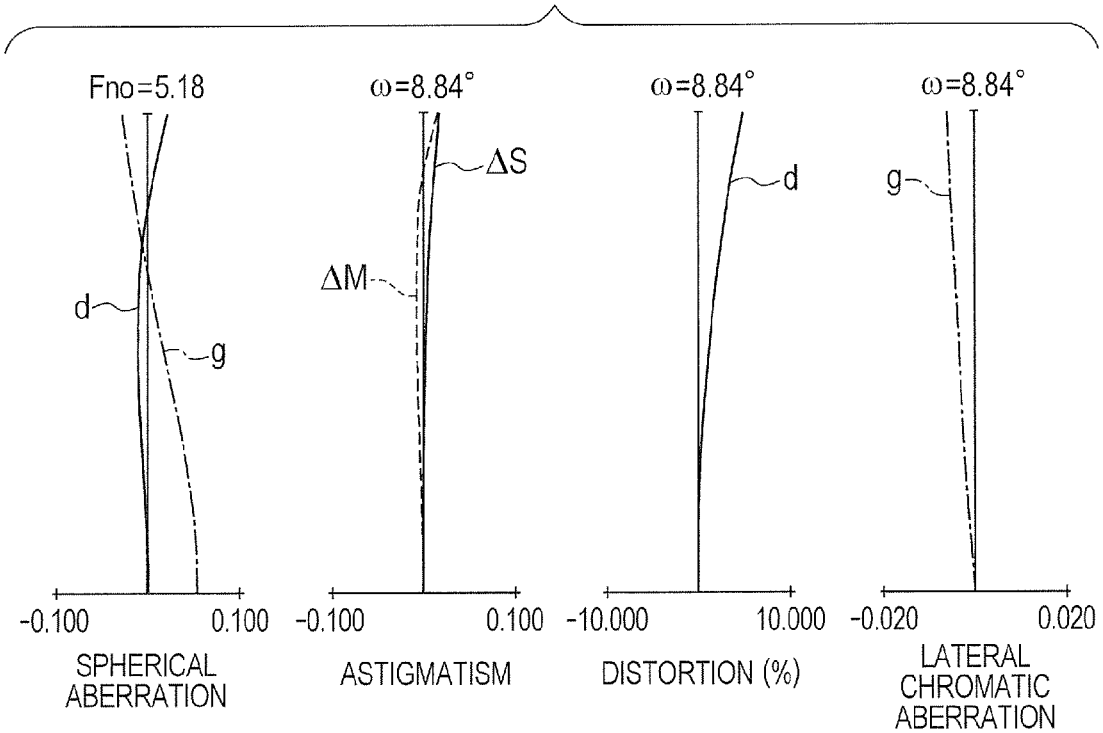

ZOOM LENS AND IMAGE PICKUP APPARATUS HAVING THE SAME

BACKGROUND OF THE INVENTION

Field of the Invention

The present invention relates to a zoom lens and an image pickup apparatus having the same, and is suitable for use in, for example, a video camera, a digital still camera, a surveillance camera, a silver-halide film camera, a broadcast camera, a smartphone, a tablet, a wearable device, or the like.

Description of the Related Art

A recent image pickup optical system for use in an image pickup apparatus incorporated in a wearable device is desired to be a zoom lens which has a high zoom ratio, is small in overall size, and allows slimming down of the image pickup apparatus.

In a conventionally known zoom lens as an image pickup optical system, a reflective member, e.g., an internally-reflective prism, is placed on the optical path to bend the optical axis of the image pickup optical system 90 degrees. U.S. Pat. No. 8,824,061 discloses a five-unit zoom lens including, in order from the object side to the image side, first to fifth lens units respectively having positive, negative, positive, positive, and negative refractive powers. In this zoom lens, a reflective member for bending the optical path is placed within the first lens unit.

SUMMARY OF THE INVENTION

The present invention aims to provide a zoom lens which has a high zoom ratio and readily achieves high optical performance over the entire zoom range, and also to provide an image pickup apparatus employing such a zoom lens.

A zoom lens of the present invention includes, in order from an object side to an image side, a first lens unit having a positive refractive power, a second lens unit having a negative refractive power, a third lens unit having a positive refractive power, a fourth lens unit having a positive refractive power, and a fifth lens unit having a negative refractive power. The first lens unit does not move for zooming, and each of the distances between the lens units adjacent to each other is changed during zooming. When a magnification amount Z2 of the second lens unit, a magnification amount Z3 of the third lens unit, and a magnification amount Z4 of the fourth lens unit are given by $Z2=\beta 2t/\beta 2w,$ $Z3=\beta 3t/\beta 3w,$ and $Z4=\beta 4t/\beta 4w,$ where β2w and β2t are respectively lateral magnifications of the second lens unit focused at infinity at a wide angle end and a telephoto end, β3w and β3t are respectively lateral magnifications of the third lens unit focused at infinity at the wide angle end and the telephoto end, and β4w and β4t are respectively lateral magnifications of the fourth lens unit focused at infinity at the wide angle end and the telephoto end, the following conditional expressions are satisfied:

$2.0 < Z2/(Z3 \times Z4) < 5.0,$ and $0.5 < |f5|/M5 < 2.0$ where f5 is a focal length of the fifth lens unit, and M5 is an amount of movement of the fifth lens unit focused at infinity in zooming from the wide angle end to the telephoto end.

Further features of the present invention will become apparent from the following description of exemplary embodiments with reference to the attached drawings.

BRIEF DESCRIPTION OF THE DRAWINGS

FIG. 2B is a diagram showing longitudinal aberrations in the zoom lens of Embodiment 1 focused on an object at infinity at a middle zoom position.

FIG. 2C is a diagram showing longitudinal aberrations in the zoom lens of Embodiment 1 focused on an object at infinity at a telephoto end.

DESCRIPTION OF THE EMBODIMENTS

Preferred embodiments of the present invention will now be described in detail in accordance with the accompanying drawings. A zoom lens of the present invention includes, in order from the object side to the image side, a first lens unit having a positive refractive power, a second lens unit having a negative refractive power, a third lens unit having a positive refractive power, a fourth lens unit having a positive refractive power, and a fifth lens unit having a negative refractive power. The first lens unit does not move for zooming, and each of the distances between the lens units adjacent to each other is changed during zooming. Note that the refractive powers are the reciprocals of focal lengths.

Figure 1:
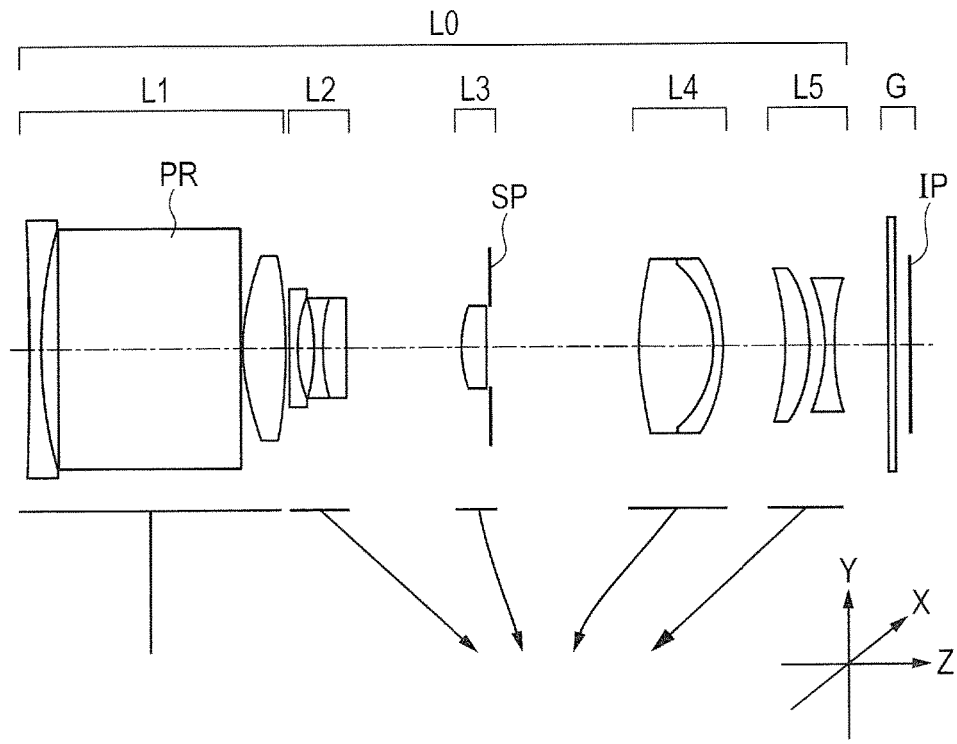
FIG. 1 is a lens sectional view of a zoom lens of Embodiment 1 focused on an object at infinity at a wide angle end.
Figure 2A:
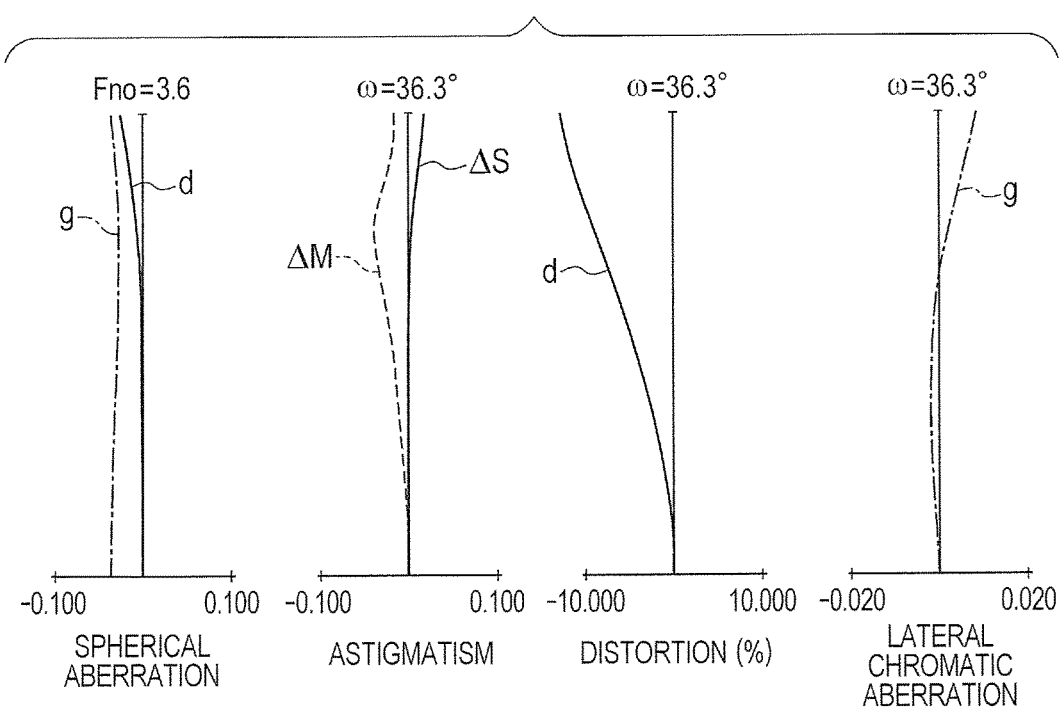
FIG. 2A is a diagram showing longitudinal aberrations in the zoom lens of Embodiment 1 focused on an object at infinity at the wide angle end.

FIG. 1 is a lens sectional view of a zoom lens according to Embodiment 1 of the present invention at a wide angle end (short focal length end). FIGS. 2A, 2B, and 2C are diagrams showing aberrations in the zoom lens of Embodiment 1 at the wide angle end, a middle zoom position, and a telephoto end (long focal length end), respectively. The zoom lens of Embodiment 1 has a zoom ratio of 4.73 and an F-number of 3.60 to 5.18.

Figure 3:
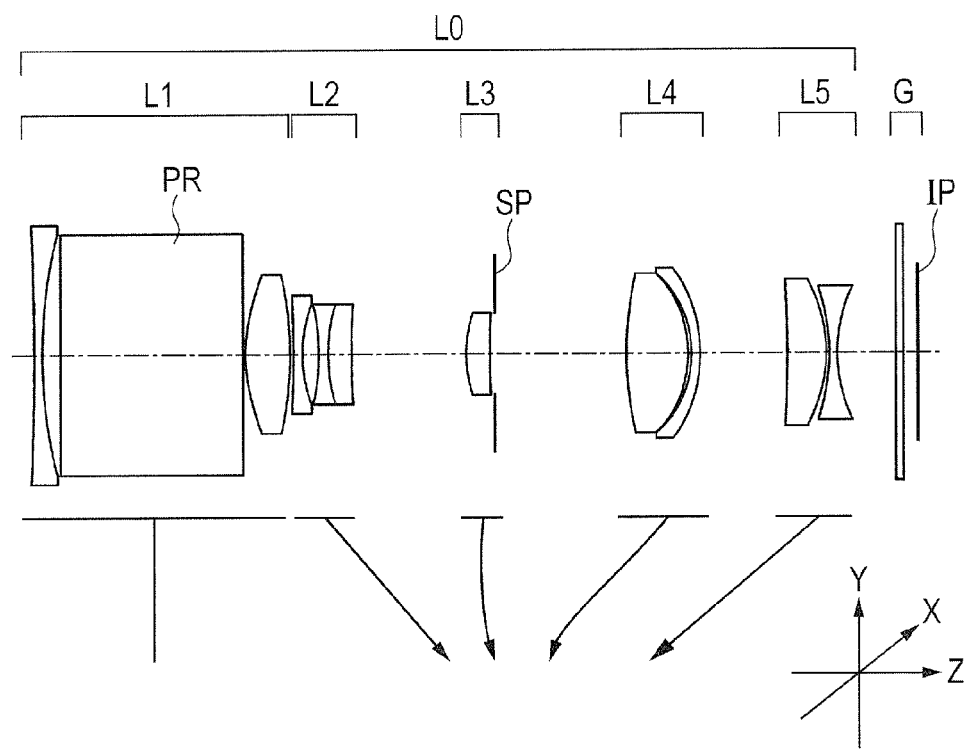
FIG. 3 is a lens sectional view of a zoom lens of Embodiment 2 focused on an object at infinity at a wide angle end.
Figure 4A:
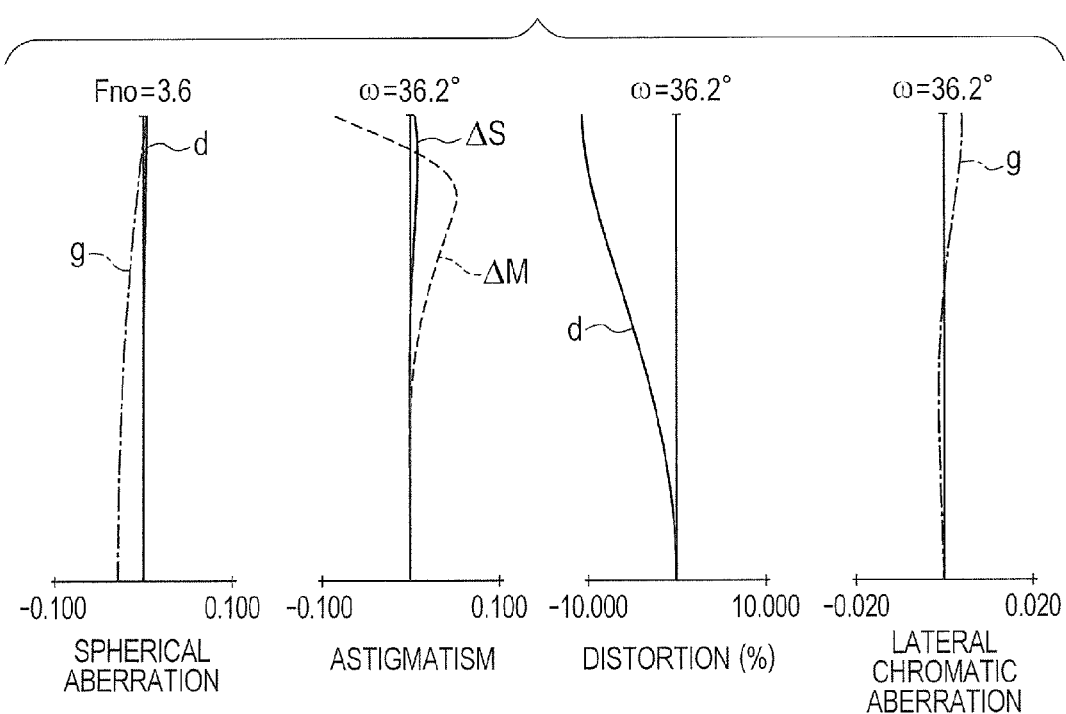
FIG. 4A is a diagram showing longitudinal aberrations in the zoom lens of Embodiment 2 focused on an object at infinity at the wide angle end.
Figure 4B:
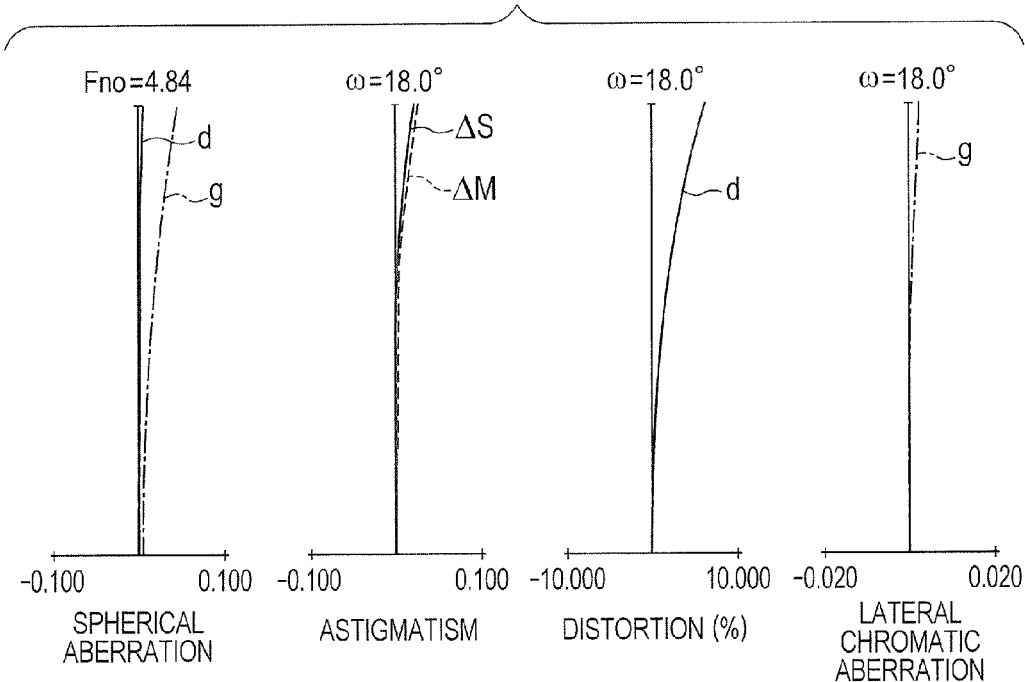
FIG. 4B is a diagram showing longitudinal aberrations in the zoom lens of Embodiment 2 focused on an object at infinity at a middle zoom position.
Figure 4C:
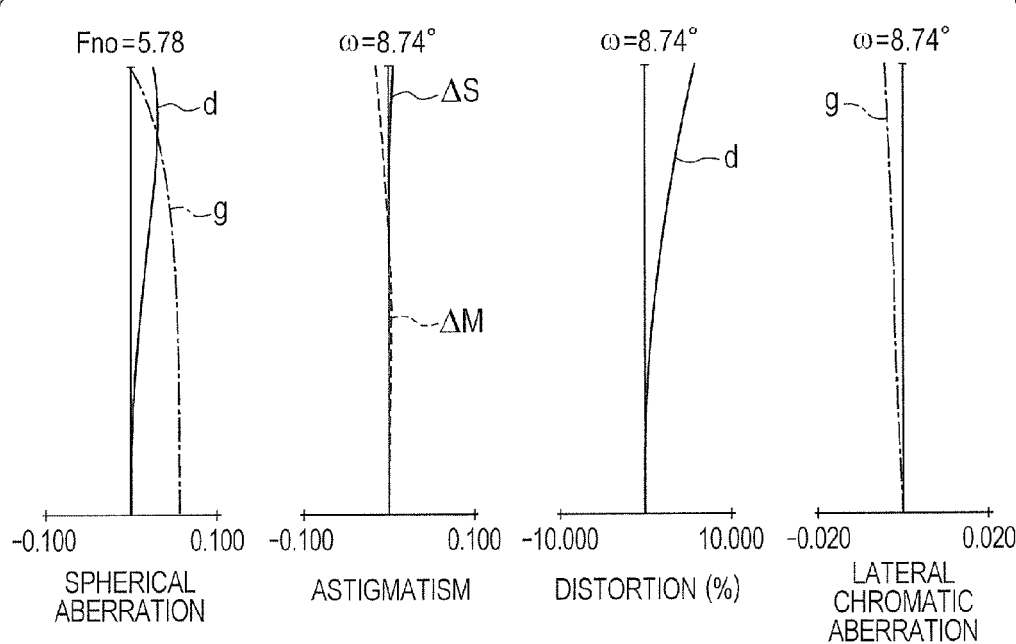
FIG. 4C is a diagram showing longitudinal aberrations in the zoom lens of Embodiment 2 focused on an object at infinity at a telephoto end.

FIG. 3 is a lens sectional view of a zoom lens according to Embodiment 2 of the present invention at a wide angle end. FIGS. 4A, 4B, and 4C are diagrams showing aberrations in the zoom lens of Embodiment 2 at the wide angle end, a middle zoom position, and a telephoto end, respectively. The zoom lens of Embodiment 2 has a zoom ratio of 4.76 and an F-number of 3.60 to 5.78.

Figure 5:
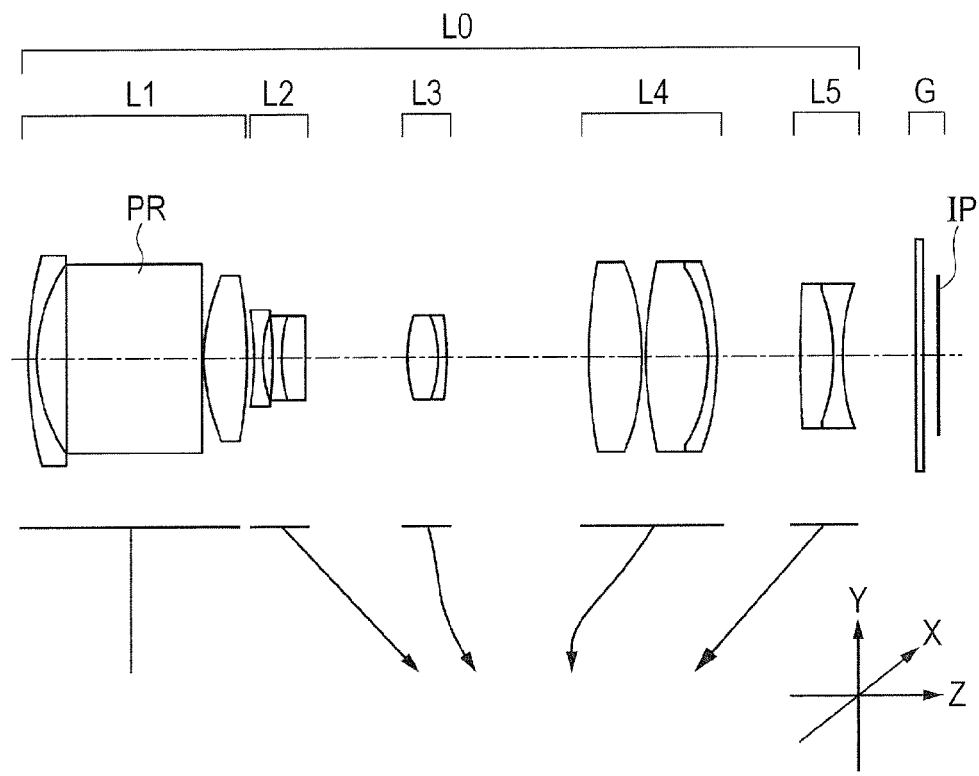
FIG. 5 is a lens sectional view of a zoom lens of Embodiment 3 focused on an object at infinity at a wide angle end.
Figure 6A:
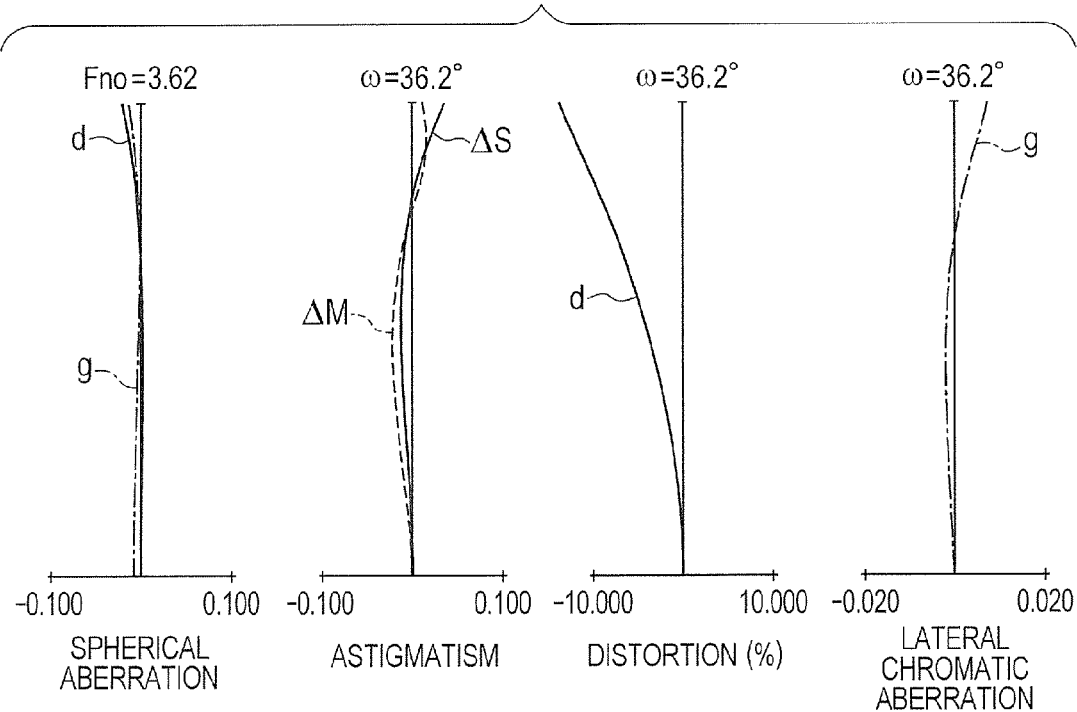
FIG. 6A is a diagram showing longitudinal aberrations in the zoom lens of Embodiment 3 focused on an object at infinity at the wide angle end.
Figure 6B:
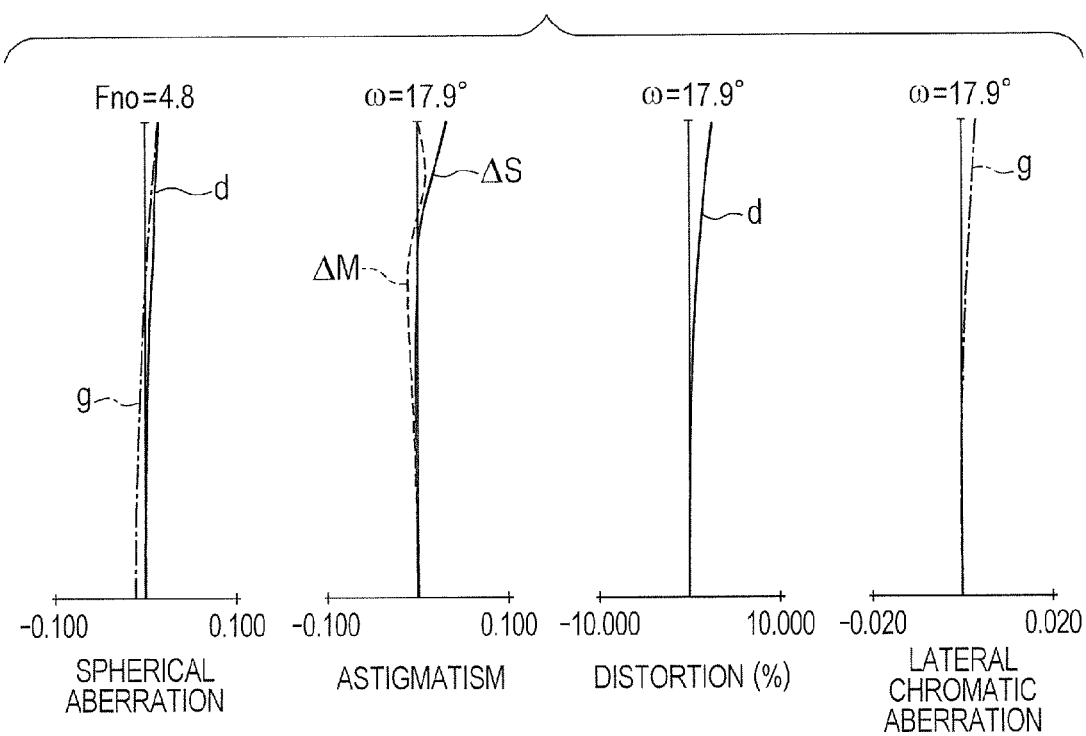
FIG. 6B is a diagram showing longitudinal aberrations in the zoom lens of Embodiment 3 focused on an object at infinity at a middle zoom position.
Figure 6C:
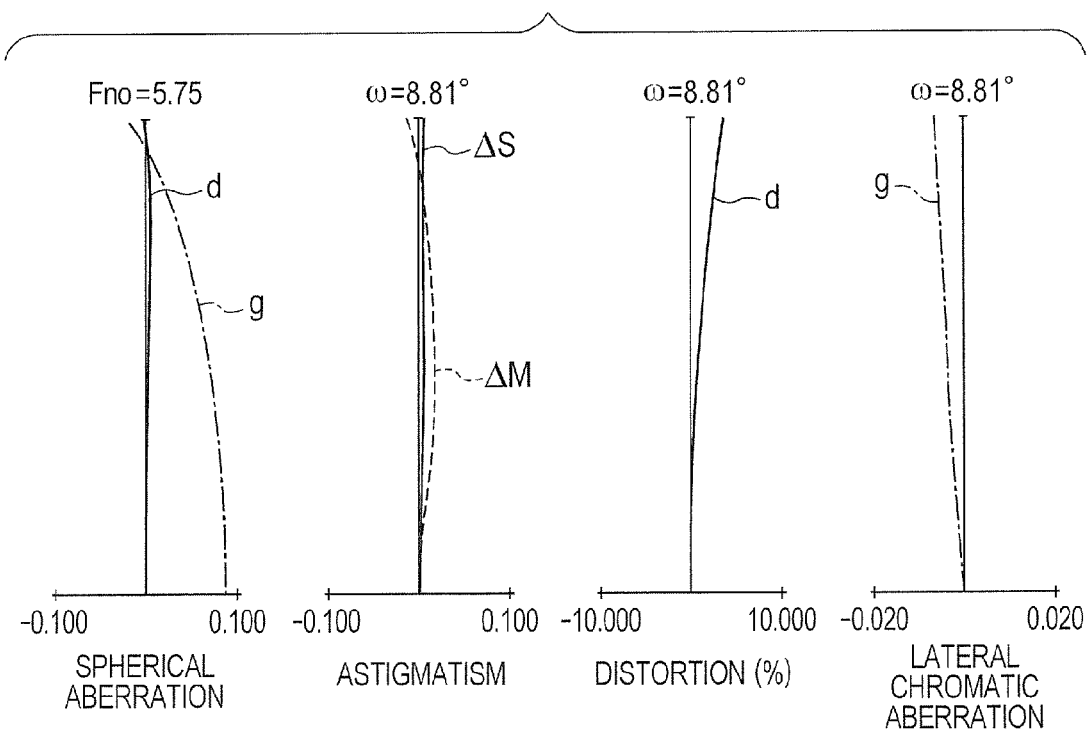
FIG. 6C is a diagram showing longitudinal aberrations in the zoom lens of Embodiment 3 focused on an object at infinity at a telephoto end.

FIG. 5 is a lens sectional view of a zoom lens according to Embodiment 3 of the present invention at a wide angle end. FIGS. 6A, 6B, and 6C are diagrams showing aberrations in the zoom lens of Embodiment 3 at the wide angle end, a middle zoom position, and a telephoto end, respectively. The zoom lens of Embodiment 3 has a zoom ratio of 4.72 and an F-number of 3.62 to 5.75.

Figure 7:
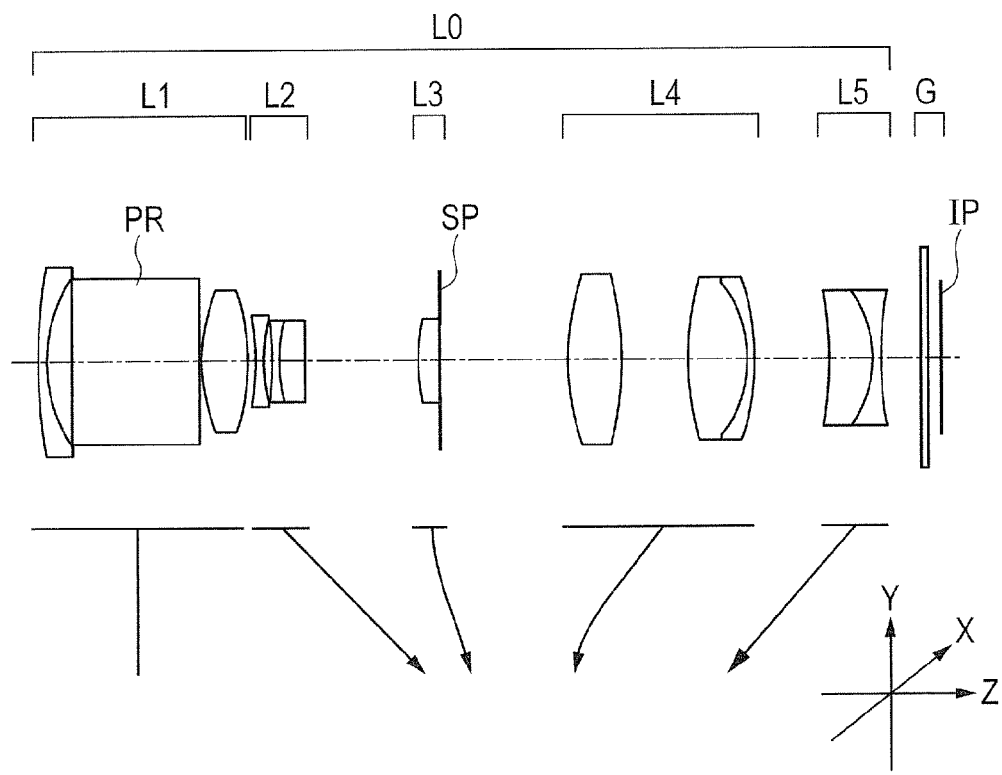
FIG. 7 is a lens sectional view of a zoom lens of Embodiment 4 focused on an object at infinity at a wide angle end.
Figure 8A:
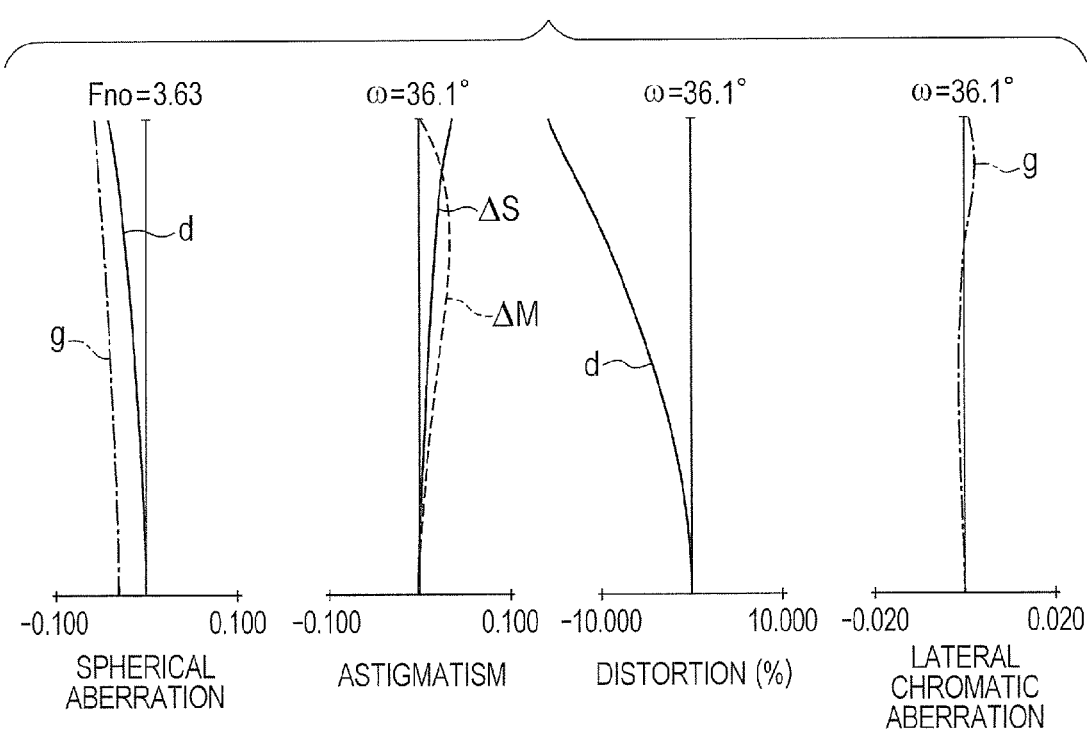
FIG. 8A is a diagram showing longitudinal aberrations in the zoom lens of Embodiment 4 focused on an object at infinity at the wide angle end.
Figure 8B:
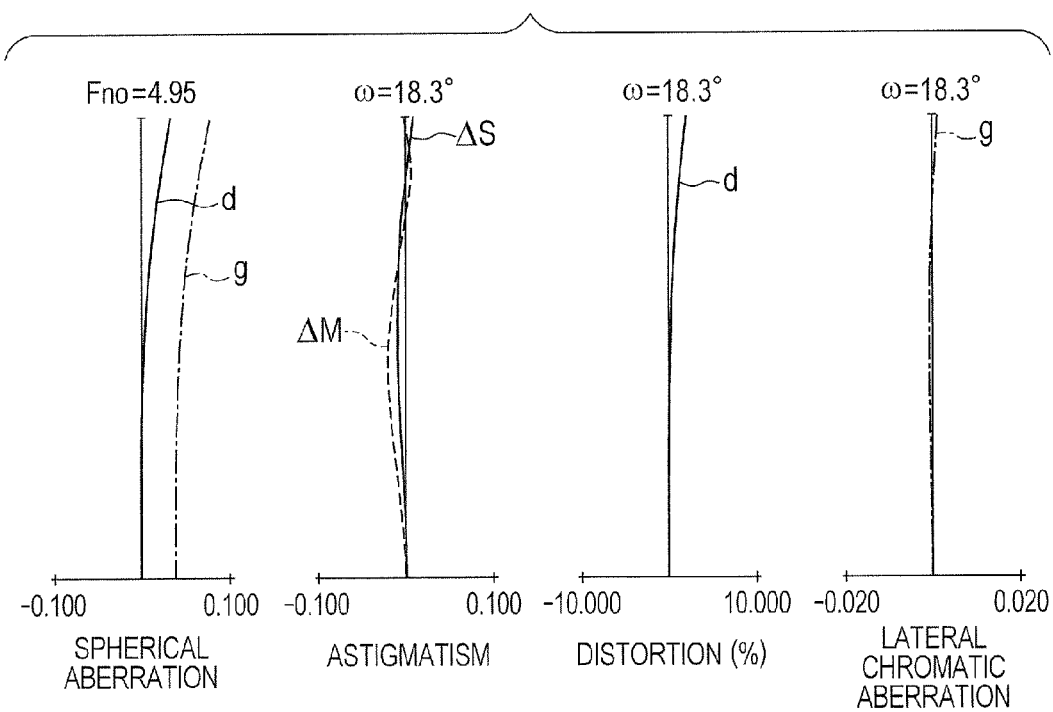
FIG. 8B is a diagram showing longitudinal aberrations in the zoom lens of Embodiment 4 focused on an object at infinity at a middle zoom position.
Figure 8C:
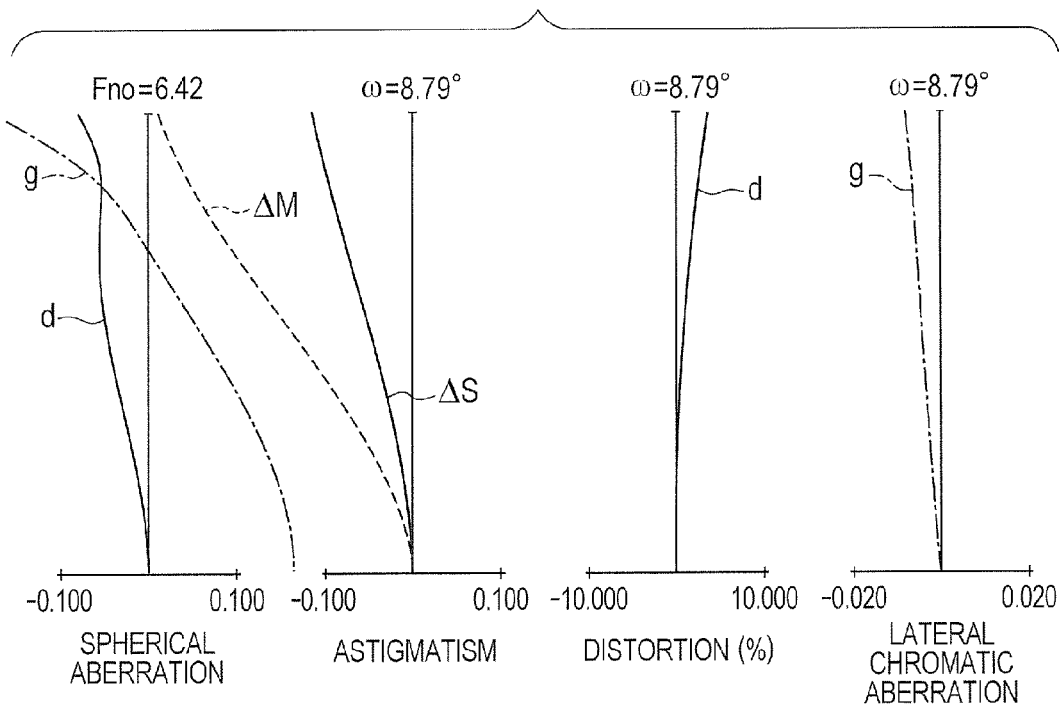
FIG. 8C is a diagram showing longitudinal aberrations in the zoom lens of Embodiment 4 focused on an object at infinity at a telephoto end.

FIG. 7 is a lens sectional view of a zoom lens according to Embodiment 4 of the present invention at a wide angle end. FIGS. 8A, 8B, and 8C are diagrams showing aberrations in the zoom lens of Embodiment 4 at the wide angle end, a middle zoom position, and a telephoto end, respectively. The zoom lens of Embodiment 4 has a zoom ratio of 4.72 and an F-number of 3.63 to 6.42.

Figure 9:
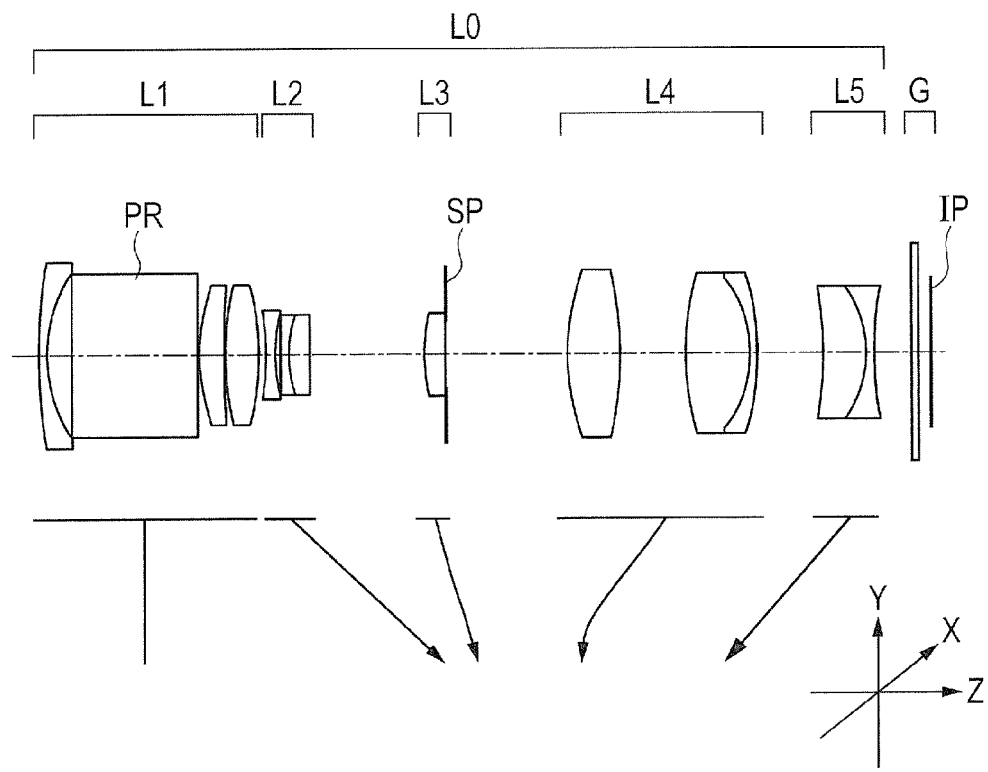
FIG. 9 is a lens sectional view of a zoom lens of Embodiment 5 focused on an object at infinity at a wide angle end.
Figure 10A:
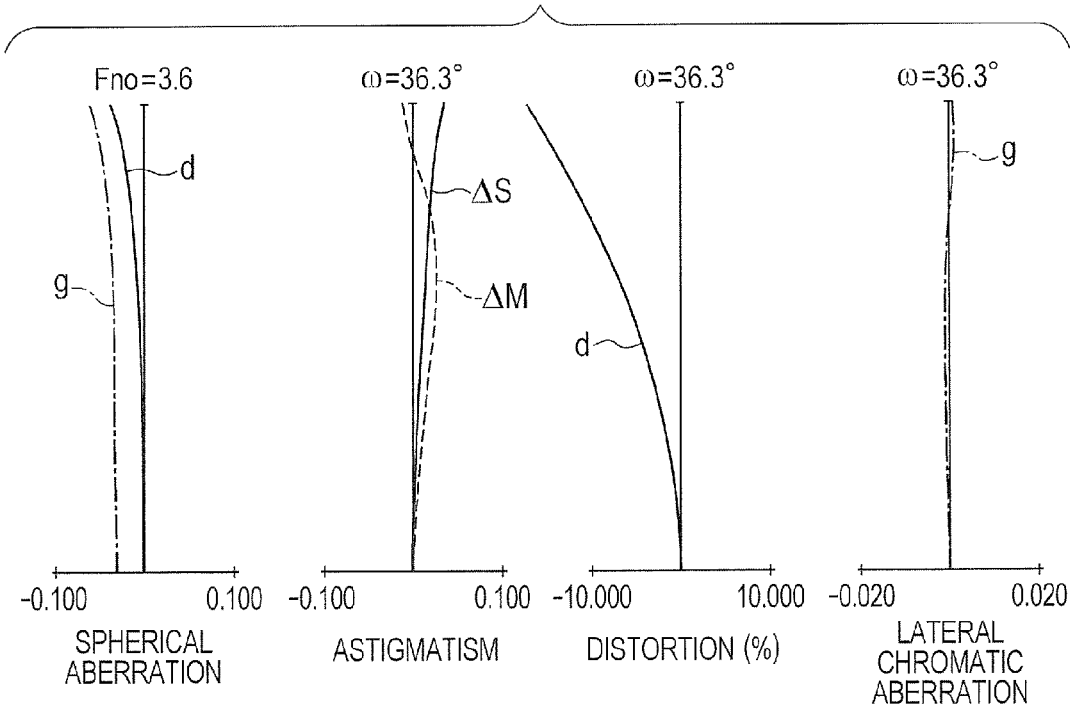
FIG. 10A is a diagram showing longitudinal aberrations in the zoom lens of Embodiment 5 focused on an object at infinity at the wide angle end.
Figure 10B:
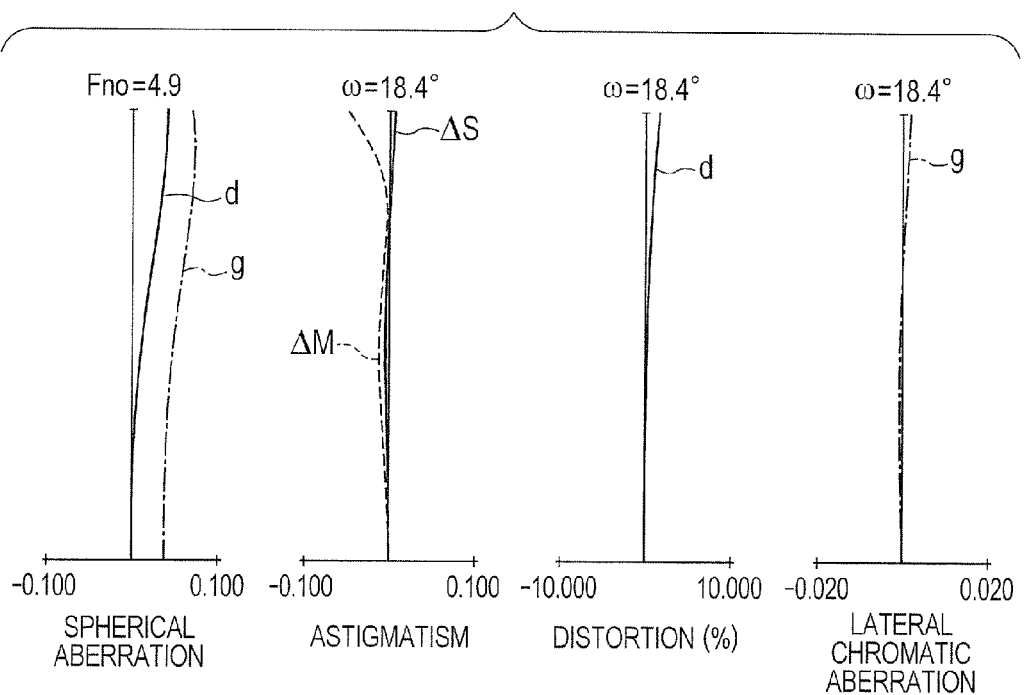
FIG. 10B is a diagram showing longitudinal aberrations in the zoom lens of Embodiment 5 focused on an object at infinity at a middle zoom position.
Figure 10C:
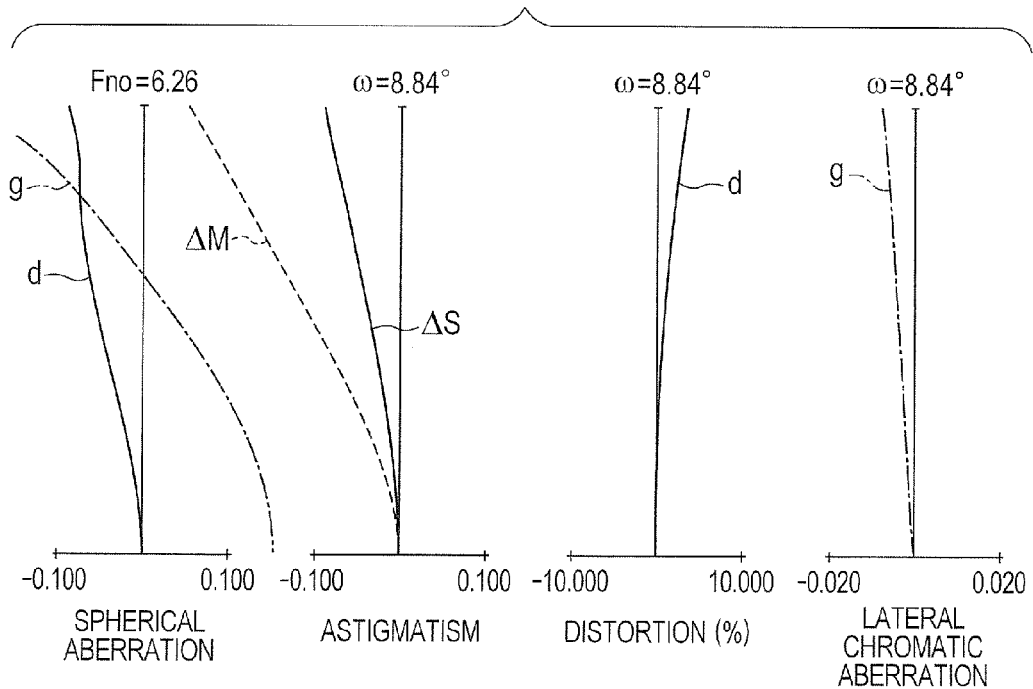
FIG. 10C is a diagram showing longitudinal aberrations in the zoom lens of Embodiment 5 focused on an object at infinity at a telephoto end.

FIG. 9 is a lens sectional view of a zoom lens according to Embodiment 5 of the present invention at a wide angle end. FIGS. 10A, 10B, and 10C are diagrams showing aberrations in the zoom lens of Embodiment 5 at the wide angle end, a middle zoom position, and a telephoto end, respectively. The zoom lens of Embodiment 5 has a zoom ratio of 4.73 and an F-number of 3.60 to 6.26.

Figure 11:
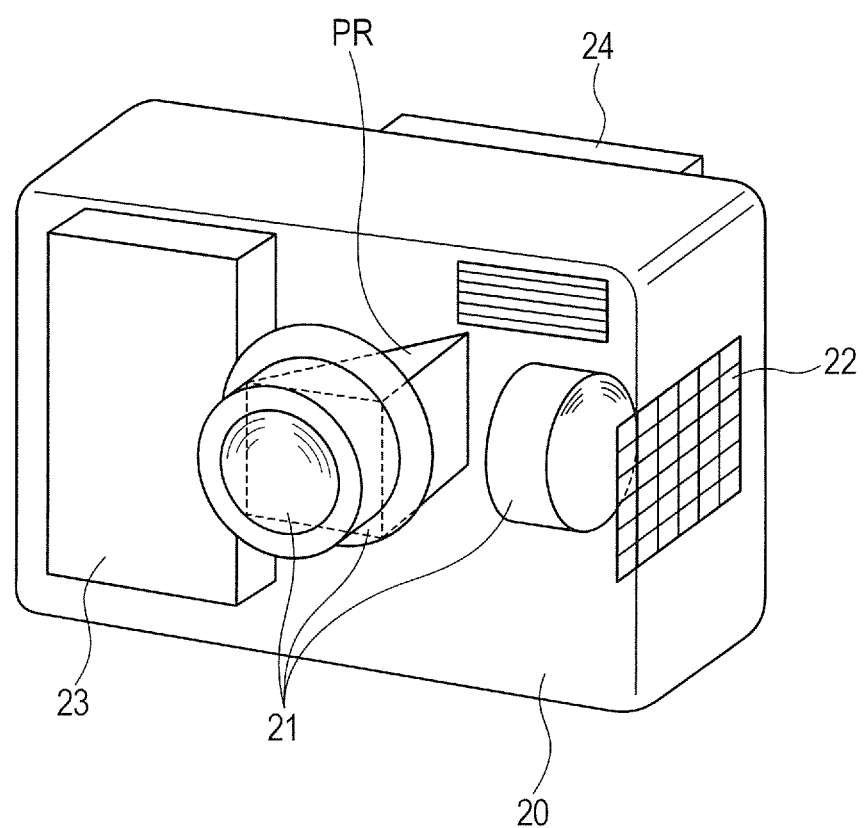
FIG. 11 is a schematic diagram showing the primary part of an image pickup apparatus.

In each embodiment, the optical path is bent by a reflective member (prism) internally having a reflective surface on the optical path. In the lens sectional view for each embodiment, however, the optical path is drawn straight for the convenience purposes. FIG. 11 is a schematic diagram showing the primary part of a camera (an image pickup apparatus) including the zoom lens of the present invention.

The zoom lens of each embodiment is an image pickup optical system for use in an image pickup apparatus such as a video camera, a digital camera, or a silver-halide film camera. In the lens sectional views, the subject (object) side (front side) is to the left, and the image side (rear side) is to the right. "L0" in each lens sectional view denotes a zoom lens. "Li" denotes an i-th lens unit, where i is the ordinal number of the lens unit from the object side.

"SP" is an aperture stop that restricts F-number light. "PR" is a reflective member that bends the optical path. In each embodiment, the reflective member is a prism (made of glass or plastic) which is placed on the optical path, includes a reflective surface, and bends the optical path 90 degrees or on the order of 90 degrees (90±10 degrees). "G" is an optical block such as an optical filter, a face plate, a quartz low-pass filter, or an infrared cut filter.

"IP" is an image plane. When the zoom lens is used as an image pickup optical system for a video camera or a digital still camera, the image plane IP corresponds to the position where the image pickup surface of a solid-state image pickup element (photoelectric conversion element), such as a CCD sensor or a CMOS sensor is disposed. When the zoom lens is used as an image pickup optical system for a silver-halide film camera, the image plane IP corresponds to the position where a photosensitive surface which is equivalent to a film plane is disposed. The arrows show the loci of movement of the lens units that move in zooming from the wide angle end to the telephoto end. In the lens sectional views, "y" is the widthwise direction of the image pickup element, "x" is the lengthwise direction of the image pickup element, and "z" is the optical axis direction.

In each aberration diagram that shows spherical aberration, "d" and "g" denote d-line (wavelength 587.6 nm) and g-line (wavelength 435.8 nm), respectively. In the astigmatism diagrams, "ΔM" and "ΔS" denote the meridional image plane and the sagittal image plane, respectively. In the lateral chromatic aberration diagrams, "g" denotes g-line. In the aberration diagrams, "ω" denotes a half angle of view (half the value of angle of view) (degrees), and "Fno" denotes an F-number. In the embodiments, the wide angle end and the telephoto end refer to available ends of the zoom range in which the lens units for zooming can move mechanically on an optical axis.

The zoom lens of the present invention includes, in order from the object side to the image side, a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. The zoom lens achieves a high zoom ratio and a reduction in the effective diameter of the front lens by employing a positive lead type arrangement of refractive powers, in which the first lens unit L1 has a positive refractive power and the second lens unit L2 has a negative refractive power.

The zoom lens achieves reduction in the total lens length by employing a telephoto arrangement for the lens units behind: the third lens unit L3 having a positive refractive power, the fourth lens unit L4 having a positive refractive power, and the fifth lens unit L5 having a negative refractive power.

The first lens unit L1 does not move for zooming. The zoom lens achieves reduction in its size in an image pickup apparatus by having fewer movable lens units to simplify the lens barrel structure. The total lens length does not change during zooming. Such a configuration of the zoom lens makes it easy to achieve an airtight image pickup apparatus, forming the lens barrel structure which is silent and resistant to impact. Further, the zoom lens of the present invention satisfies the conditional expressions given further below (Conditional Expressions (1) and (2)).

The magnification amount Z2 of the second lens unit L2, the magnification amount Z3 of the third lens unit L3, and the magnification amount Z4 of the fourth lens unit L4 are given as $$Z2=\beta 2t/\beta 2w$$

$$Z3=\beta 3t/\beta 3w$$

$$Z4=\beta 4t/\beta 4w$$

where β2w and β2t are respectively the lateral magnifications of the second lens unit L2 focused at infinity at the wide angle end and the telephoto end, β3w and β3t are respectively the lateral magnifications of the third lens unit L3 focused at infinity at the wide angle end and the telephoto end, and β4w and β4t are respectively the lateral magnifications of the fourth lens unit L4 focused at infinity at the wide angle end and the telephoto end.

Then, the zoom lens satisfies the following conditional expressions:

$$2.0<Z2/(Z3\times Z4)<5.0 \quad (1)$$

$$0.5<|f5|/M5<2.0 \quad (2)$$

where f5 is the focal length of the fifth lens unit L5, and M5 is the amount of movement of the fifth lens unit L5 focused at infinity in zooming from the wide angle end to the telephoto end.

The amount of movement of a lens unit is the difference between the positions of the lens unit on the optical axis at the wide angle end and the telephoto end, respectively. The amount of movement has a negative sign when the lens unit is located closer to the image side at the telephoto end than at the wide angle end, and has a positive sign when the lens unit is located closer to the object side at the telephoto end than at the wide angle end.

Next, the technical meanings of the above-given conditional expressions are described. Conditional Expression (1) defines the ratio of the magnification amount of the second lens unit L2 to the product of the magnification amounts of the third lens unit L3 and the fourth lens unit L4, in zooming from the wide angle end to the telephoto end.

In the zoom lens of the present invention, the second lens unit L2, the third lens unit L3, and the fourth lens unit L4 play their respective parts in primary zooming. The aperture stop SP has a constant aperture diameter during zooming, and the substantial position of the aperture stop SP in the zoom lens is near the third lens unit L3. When the zoom lens satisfies Conditional Expression (1), a part played by the second lens unit L2 in the zooming of the zoom lens can be optimized.

Specifically, the second lens unit L2, which is placed on the object side of the aperture stop SP, plays a large part in the zooming, so that Fno (F-number) does not vary much during zooming and does not decrease much at the telephoto end. This way, the diffraction limit at the telephoto end is mitigated, so as to achieve favorable optical performance over the entire zoom range.

If the value of Conditional Expression (1) falls below its lower limit because the second lens unit L2 plays too small a part in the zooming, Fno varies too much during zooming and decreases greatly at the telephoto end. If, by contrast, the value of Conditional Expression (1) exceeds its upper limit because the second lens unit L2 plays too large a part in the zooming, the refractive power of the second lens unit L2 becomes too strong, increasing image plane variation caused by zooming so much that its correction is difficult. In addition, the amount of movement of the second lens unit L2 in zooming becomes too large, which is unfavorable in a configuration with the immobile first lens unit L1 because the effective diameter of the front lens increases.

Conditional Expression (2) defines the ratio of the focal length of the fifth lens unit L5 to the amount of movement of the fifth lens unit L5 in zooming from the wide angle end to the telephoto end. In the zoom lens of the present invention, the fifth lens unit L5 moves for zooming to play a certain part in the zooming. When the zoom lens satisfies Conditional Expression (2), the ratio of the focal length of the fifth lens unit L5 to the amount of movement thereof can be optimized to achieve a high zoom ratio and a reduction in the size of the zoom lens.

If the value of Conditional Expression (2) falls below its lower limit because the focal length of the fifth lens unit L5 is too small in relation to the amount of movement thereof in zooming, the exit pupil position is too close to the image plane at the wide angle end. As a result, peripheral light flux falls incident on the image plane at too large an angle, deteriorating the shading properties. If, by contrast, the value of Conditional Expression (2) exceeds its upper limit because the focal length of the fifth lens unit L5 is too large in relation to the amount of movement thereof in zooming, a telephoto configuration formed by the third lens unit L3, the fourth lens unit L4, and the fifth lens unit L5 has too weak an arrangement of refractive powers, increasing the total lens length.

By satisfying Conditional Expressions (1) and (2) at the same time, the zoom lens achieves favorable optical performance and enables size reduction of the image pickup apparatus.

More preferably, the numbers in Conditional Expressions (1) and (2) may be set as follows.

$$2.1<Z2/(Z3\times Z4)<4.5 \quad (1a)$$

$$0.80<|f5|/M5<1.85 \quad (2a)$$

Still more preferably, the numbers in Conditional Expressions (1a) and (2a) may be set as follows.

$$2.2<Z2/(Z3\times Z4)<4.0 \quad (1b)$$

$$1.0<|f5|/M5<1.8 \quad (2b)$$

Preferably, the zoom lens of the present invention may satisfy at least one of the following conditional expressions:

$$1.9<f1/fw<2.6 \quad (3)$$

$$0.6<|f2|/fw<1.4 \quad (4)$$

$$1.8<f1/|f2|<3.0 \quad (5)$$

$$0.1<|f5|/ft<0.6 \quad (6)$$

$$0.5<100\times(D23t+D34t)/ft<10.0 \quad (7)$$

$$-1.00<M3/fw<-0.02 \quad (8)$$

$$0.1<D1/ft<0.6 \quad (9)$$

$$1.8<Ndpr<2.5 \quad (10)$$

where f1 is the focal length of the first lens unit L1, fw is the focal length of the zoom lens at the wide angle end, f2 is the focal length of the second lens unit L2, ft is the focal length of the zoom lens at the telephoto end, D23t is the distance between the second lens unit L2 and the third lens unit L3 focused at infinity at the telephoto end, D34t is the distance between the third lens unit L3 and the fourth lens unit L4 focused at infinity at the telephoto end, M3 is the amount of movement of the third lens unit L3 in zooming from the wide angle end to the telephoto end, D1 is the thickness of the first lens unit L1 (the distance along the optical axis from the object-side lens surface to the image-side lens surface), and Ndpr is the refractive index, for d-line, of a material of a prism, which is placed within the first lens unit L1 as a reflective member with a reflective surface that bends the optical path.

Next, the technical meanings of the above-given conditional expressions are described. Conditional Expression (3) defines the focal length of the first lens unit L1. If the value of Conditional Expression (3) falls below its lower limit because the focal length of the first lens unit L1 is too short, it is difficult to correct axial chromatic aberration and lateral chromatic aberration especially at the telephoto end. If, by contrast, the value of Conditional Expression (3) exceeds its upper limit because the focal length of the first lens unit L1 is too long, the effective diameter of the front lens increases especially in a configuration where the first lens unit L1 does not move for zooming.

Conditional Expression (4) defines the negative focal length of the second lens unit L2. If the value of Conditional Expression (4) falls below its lower limit because the negative focal length of the second lens unit L2 is too short (or too small in absolute value), it is difficult to correct variation in the curvature of field over the entire zoom range.

If, by contrast, the value of Conditional Expression (4) exceeds its upper limit because the negative focal length of the second lens unit L2 is too long (or too large in absolute value), the amount of movement of the second lens unit L2 in zooming increases when Conditional Expression (1) is satisfied with such a negative focal length. The total lens length consequently increases.

Conditional Expression (5) defines the ratio of the focal length of the first lens unit L1 to the focal length of the second lens unit L2. If the value of Conditional Expression (5) falls below its lower limit because the focal length of the first lens unit L1 is too short in relation to the focal length of the second lens unit L2, it is difficult to correct chromatic aberration at the telephoto end, and also, the total lens length increases. If, by contrast, the value of Conditional Expression (5) exceeds its upper limit because the focal length of the first lens unit L1 is too long in relation to the focal length of the second lens unit L2, the effective diameter of the front lens increases, and also, it is difficult to correct the curvature of field over the entire zoom range.

Conditional Expression (6) defines the focal length of the fifth lens unit L5. If the value of Conditional Expression (6) falls below its lower limit because the focal length of the fifth lens unit L5 is too short, the zoom lens that satisfies Conditional Expression (2) and has the fifth lens unit L5 with such a focal length has to employ a lens arrangement where the fifth lens unit L5 plays an excessively large part in the zooming. Then, variation in Fno in zooming increases.

If, by contrast, the value of Conditional Expression (6) exceeds its upper limit because the focal length of the fifth lens unit L5 is too long, the zoom lens has to employ a lens arrangement where the fifth lens unit L5 plays an excessively small part in the zooming. Then, to achieve a high zoom ratio, the zoom lens has to be increased in size.

Conditional Expression (7) defines the arrangement of the second lens unit L2, the third lens unit L3, and the fourth lens unit L4 at the telephoto end. In each embodiment of the present invention, the aperture stop mechanism is simplified as much as possible to achieve size reduction of the zoom lens. If the value of Conditional Expression (7) falls below its lower limit, the mechanical barrels of the lens units are likely to interfere with each other when the zoom lens is at the telephoto end. If, by contrast, the value of Conditional Expression (7) exceeds its upper limit, the distance between the second lens unit L2 and the third lens unit L3 and the distance between the third lens unit L3 and the fourth lens unit L4 become too large, increasing the size of the zoom lens.

Conditional Expression (8) defines the amount of movement of the third lens unit L3 in zooming. If the value of Conditional Expression (8) falls below its lower limit because the amount of movement of the third lens unit L3 is too small, it is difficult to reduce the effective diameter of the front lens. If, by contrast, the value of Conditional Expression (8) exceeds its upper limit because the amount of movement of the third lens unit L3 is too large, the size of the zoom lens is unfavorably increased to avoid interference with the fourth lens unit L4 moving to the object side for zooming.

Conditional Expression (9) defines the thickness of the first lens unit L1 (the distance from the object-side lens surface to the image-side lens surface). If the value of Conditional Expression (9) falls below its lower limit because the first lens unit L1 is too thin, it is difficult to place the reflective member PR for bending the optical axis within the first lens unit L1. If, by contrast, the value of Conditional Expression (9) exceeds its upper limit because the first lens unit L1 is too thick, the thickness of the image pickup apparatus unfavorably increases.

Conditional Expression (10) defines the refractive index of the material of the prism serving as the reflective member PR placed within the first lens unit L1. If the value of Conditional Expression (10) falls below its lower limit because the refractive index of the material of the prism is too small, the size of the prism increases when the length in air is constant, and therefore the thickness of the image pickup apparatus increases.

If, by contrast, the value of Conditional Expression (10) exceeds its upper limit because the refractive index of the material of the prism is too large, the color balance of the image pickup apparatus cannot be maintained. This is because an optical material having a refractive index exceeding the upper limit of Conditional Expression (10) tends to have an extremely low transmittance.

More preferably, the numbers in Conditional Expressions (3) to (10) may be set as follows.

$$2.0 < f1/fw < 2.5 \tag{3a}$$

$$0.7 < |f2|/fw < 1.3 \tag{4a}$$

$$1.90 < f1/|f2| < 2.85 \tag{5a}$$

$$0.2 < |f5|/ft < 0.5 \tag{6a}$$

$$1.0 < 100 \times (D23t + D34t)/ft < 7.0 \tag{7a}$$

$$-0.80 < M3/fw < -0.06 \tag{8a}$$

$$0.20 < D1/ft < 0.55 \tag{9a}$$

$$1.85 < Ndpr < 2.35 \tag{10a}$$

Still more preferably, the numbers in Conditional Expressions (3a) to (10a) may be set as follows.

$$2.1 < f1/fw < 2.4 \tag{3b}$$

$$0.8 < |f2|/fw < 1.2 \tag{4b}$$

$$2.0 < f1/|f2| < 2.7 \tag{5b}$$

$$0.30 < |f5|/ft < 0.48 \quad (6b)$$

$$1.5 < 100 \times (D23t + D34t)/ft < 3.0 \quad (7b)$$

$$-0.60 < M3/fw < -0.09 \quad (8b)$$

$$0.3 < D1/ft < 0.5 \quad (9b)$$

$$1.9 < Ndpr < 2.2 \quad (10b)$$

In each embodiment, the third lens unit L3 moves for zooming. When the third lens unit L3 moves for zooming, variation in aberrations at the middle zoom position can be favorably corrected to achieve favorable optical performance over the entire zoom range. The third lens unit L3 is closer to the object at the wide angle end than at the telephoto end.

In the present invention, the substantial position of the aperture stop SP in the zoom lens is near the third lens unit L3. Such a configuration facilitates placement of the entrance pupil position close to the first lens unit L1 in an area near the wide angle end, making it easy to reduce the effective diameter of the front lens.

In each embodiment, the reflective member with a reflective surface is placed within the first lens unit L1 to bend the optical axis substantially 90 degrees in the first lens unit L1. Although the reflective surface is not shown in each embodiment, a total reflection prism is placed within the first lens unit L1. The reflective member bends the optical axis in the widthwise direction of the image plane so as to reduce the thickness of the image pickup apparatus. By the small effective diameter of the front lens, the total reflection prism can be reduced in size, which in turn reduces the thickness of the zoom lens in the image pickup apparatus.

The lens configurations of the respective embodiments are described next.

[Embodiment 1]

The zoom lens according to Embodiment 1 of the present invention is described below with reference to FIG. 1. The zoom lens of Embodiment 1 includes, in order from the object side to the image side, a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power.

The first lens unit L1 does not move for zooming from the wide angle end to the telephoto end. This facilitates simplification of the mechanism for driving the lens units, and also makes the zoom lens airtight so that the image pickup apparatus can be rigid and resistant to external perturbations. For zooming from the wide angle end to the telephoto end, the second lens unit L2 and the third lens unit L3 move to the image side, and the fourth lens unit L4 and the fifth lens unit L5 move to the object side.

With such a lens configuration, the zooming is conducted by these lens units, and variation in aberrations is reduced over the entire zoom range to achieve favorable optical performance over the entire zoom range. Since the third lens unit L3 in particular moves in such a manner that it is located closer to the object side at the wide angle end than at the telephoto end, the effective diameter of the front lens is reduced. Since the fifth lens unit L5 moves to the object side for zooming from the wide angle end to the telephoto end, multiplication effect is obtained to achieve a short total lens length with a high zoom ratio achieved.

The first lens unit L1 includes a negative lens having a stronger curvature at the image-side lens surface than at the object-side lens surface, the total reflection prism PR as a reflective member, and a positive biconvex lens having aspheric surfaces. The second lens unit L2 includes a negative lens having aspheric surfaces and having a stronger curvature at the image-side lens surface than at the object-side lens surface, a biconcave negative lens, and a positive lens having a stronger curvature at the object-side lens surface than at the image-side lens surface. The third lens unit L3 includes a positive lens having an aspheric surface and having a stronger curvature at the object-side lens surface than at the image-side lens surface.

The fourth lens unit L4 includes a positive biconvex lens having an aspheric surface and a negative meniscus lens having a convex surface facing toward the image side. The fifth lens unit L5 includes a positive meniscus lens having a convex surface facing toward the image side and a negative biconcave lens having an aspheric surface. Size reduction of the zoom lens and high optical performance are achieved by optimization of the arrangement of the lens units as to their refractive powers, the configurations of the respective lens units, and the trajectories of the movable lens units.

[Embodiment 2]

The zoom lens according to Embodiment 2 of the present invention is described below with reference to FIG. 3. The zoom lens of Embodiment 2 has the same basic configurations (such as the number of the lens units, the refractive powers of the lens units, and if and how the lens units move for zooming) as that of Embodiment 1. Embodiment 2 is different from Embodiment 1 in the arrangement of the lens units as to their relative refractive powers and the shapes of certain lens units. Another difference is that, for zooming from the wide angle end to the telephoto end, the third lens unit L3 moves toward the image side while describing a trajectory concave toward the object side.

[Embodiment 3]

The zoom lens according to Embodiment 3 of the present invention is described below with reference to FIG. 5. The zoom lens of Embodiment 3 has the same basic configurations as that of Embodiment 1. Embodiment 3 is different from Embodiment 1 in that the effective diameter of the front lens is reduced by modifying the arrangement of the lens units as to their refractive powers and the configurations of certain lens units.

The third lens unit L3 includes a positive biconvex lens having an aspheric surface and a negative meniscus lens having a convex surface facing toward the image side. The fourth lens unit L4 includes a positive biconvex lens having an aspheric surface, a positive biconvex lens, and a negative meniscus lens having a convex surface facing toward the image side. By having two positive lenses instead of one, the fourth lens unit L4 can be reduced in its effective diameter, and variations in spherical aberration and coma in zooming can be corrected.

A glass material having a high refractive index is used for the total reflection prism PR serving as a reflective member within the first lens unit L1, so as to achieve further reduction in the effective diameter of the front lens.

[Embodiment 4]

The zoom lens according to Embodiment 4 of the present invention is described below with reference to FIG. 7. The zoom lens of Embodiment 4 has the same basic configurations as that of Embodiment 1.

Embodiment 4 is different from Embodiment 1 in that the effective diameter of the front lens is further reduced by modification of the arrangement of the lens units as to their refractive powers and the configurations of certain lens units. The fourth lens unit L4 includes a positive biconvex lens having an aspheric surface, a positive biconvex lens, and a negative meniscus lens having a convex surface facing toward the image side. By having two positive lenses instead of one, the fourth lens unit L4 can be reduced in its effective diameter, and variations in spherical aberration and coma in zooming can be favorably corrected.

[Embodiment 5]

The zoom lens according to Embodiment 5 of the present invention is described below with reference to FIG. 9. The zoom lens of Embodiment 5 has the same basic configurations as that of Embodiment 4. Embodiment 5 is different from Embodiment 4 in the configurations of certain lens units.

The first lens unit L1 includes a negative lens having a stronger curvature at the image-side lens surface than at the object-side lens surface, the total reflection prism PR as a reflective member, a positive meniscus lens having a convex surface facing toward the object side, and a positive biconvex lens having an aspheric surface. When the first lens unit L1 includes two positive lenses instead of one, variation in coma can be favorably corrected, particularly in zooming.

For focusing from infinity to close-up, the zoom lens of each embodiment employs rear focus, in which the fifth lens unit L5 moves to the image side. Size reduction of the zoom lens is thereby achieved. Any of various known techniques is employed for the correction of image blur, such as a configuration for moving at least one of the lens units, preferably the second lens unit L2, in a direction with a vertical component with respect to the optical axis, or a configuration for moving the image pickup element. When used in an image pickup apparatus, the zoom lens is corrected for its distortion aberration electronically using any of various known techniques.

Although preferred embodiments of the present invention have been described above, the present invention is not limited to these embodiments and can be modified and changed variously without departing from the gist thereof.

Next, with reference to FIG. 11, a description is given of an embodiment of a digital still camera that includes any of the zoom lenses of the embodiments as an image pickup optical system. In FIG. 11, "20" denotes a camera body, and "21" denotes an image pickup optical system formed by any of the zoom lenses described in Embodiments 1 to 5.

"PR" is a reflective member that bends the optical path. "22" is a solid-state image pickup element (photoelectric conversion element), such as a CCD sensor or a CMOS sensor, that is incorporated in the camera body 20 to receive a subject image formed by the image pickup optical system 21. "23" is a memory that stores information representing the subject image photoelectrically converted by the solid-state image pickup element 22. "24" is a viewfinder formed by a liquid crystal display panel or the like and used to observe the subject image formed on the solid-state image pick-up element 22. When the zoom lens of the present invention is thus applied to an image pickup apparatus such as a digital still camera, the image pickup apparatus can be reduced in size and offer high optical performance.

Next, Numerical Data 1 to 5 corresponding respectively to Embodiments 1 to 5 of the present invention are demonstrated. In each numerical data, "i" represents the ordinal number of an optical surface from the object side, "ri" represents the radius of curvature of the i-th optical surface (or simply the i-th surface), "di" represents the distance between the i-th surface and the (i+1)-th surface, and ndi and vdi respectively represent the refractive index and the Abbe number, for d-line, of a material of an optical member between the i-th surface and the (i+1)-th surface.

In addition, with "k" representing an eccentricity, "A4", "A6", and "A8" representing aspherical coefficients, and "x" representing a displacement from the surface vertex along the optical axis at a height h from the optical axis, an aspherical shape is expressed as follows:

$$x=(h^2/R)/[1+[1-(1+k)(h/R)^2]^{1/2}]+A4h^4+A6h^6+A8h^8$$

where R represents the paraxial radius of curvature. "E-Z", for example, indicates "x10$^{-z}$".

In each of Numerical Data 1 to 5, Surface Numbers 3 and 4 are the surfaces of the reflective member PR, and the last two surfaces are those of an optical block such as a filter or a face plate. In each numerical data, a back focal length (BF) represents the distance in air from the rearmost lens surface to a paraxial image plane. The total lens length is a total distance of the back focal length in air and the distance from the surface of the lens closest to an object to the rearmost lens surface. Table 1 shows correspondences between the above-given conditional expressions and Numerical Data 1 to 5.

[Numerical Value Embodiment 1]

[unit: mm]

Surface data

| Surface number | r | d | nd | vd | Effective diameter |
|---|---|---|---|---|---|
| 1 | −99.892 | 0.40 | 2.00272 | 19.3 | 8.20 |
| 2 | 18.713 | 0.55 | | | 7.70 |
| 3 | ∞ | 6.20 | 1.91082 | 35.3 | 7.62 |
| 4 | ∞ | 0.10 | | | 6.10 |
| 5* | 8.054 | 1.43 | 1.76802 | 49.2 | 5.80 |
| 6* | −19.295 | (variable) | | | 5.43 |
| 7* | −170.899 | 0.30 | 1.85135 | 40.1 | 3.72 |
| 8* | 5.226 | 0.57 | | | 3.25 |
| 9 | −6.546 | 0.30 | 1.88300 | 40.8 | 3.16 |
| 10 | 7.134 | 0.80 | 1.95906 | 17.5 | 3.05 |
| 11 | −47.774 | (variable) | | | 2.93 |
| 12* | 4.803 | 0.83 | 1.49710 | 81.6 | 2.59 |
| 13 | −42.872 | 0.10 | | | 2.60 |
| 14(stop) | ∞ | (variable) | | | 2.65 |
| 15* | 8.216 | 2.50 | 1.67790 | 54.9 | 5.15 |
| 16 | −3.924 | 0.30 | 1.95906 | 17.5 | 5.28 |
| 17 | −6.355 | (variable) | | | 5.51 |
| 18 | −8.928 | 0.82 | 1.89286 | 20.4 | 4.79 |
| 19 | −5.183 | 0.51 | | | 4.86 |
| 20 | −6.099 | 0.30 | 1.90270 | 31.0 | 4.23 |
| 21* | 11.099 | (variable) | | | 4.20 |
| 22 | ∞ | 0.25 | 1.51633 | 64.1 | 8.00 |
| 23 | ∞ | 0.50 | | | 8.00 |
| Image plane | ∞ | | | | |

Aspheric surface data

5th surface

K = 0.00000e+000
A4 = −2.31920e−004
A6 = −1.86372e−006
A8 = 6.56316e−008

6th surface

K = 0.00000e+000
A4 = 1.99857e−004

7th surface

K = 0.00000e+000
A4 = 2.44291e−003

8th surface

K = 0.00000e+000
A4 = 1.95529e−003
A6 = 2.55004e−004
A8 = 3.11313e−005

-continued

[unit: mm]

12th surface

K = 0.00000e+000
A4 = −1.95797e−003
A6 = 2.72581e−005

15th surface

K = 0.00000e+000
A4 = −1.54900e−003
A6 = −4.33859e−006
A8 = −4.46322e−006

21th surface

K = 0.00000e+000
A4 = 3.00447e−003
A6 = 8.15257e−005
A8 = 1.71050e−005

Various data
Zoom ratio 4.73

|  | Wide angle | Middle | Telephoto |
|---|---|---|---|
| Focal length | 4.08 | 8.85 | 19.30 |
| F-NUMBER | 3.60 | 4.55 | 5.18 |
| Half angle of view (deg) | 36.31 | 18.73 | 8.84 |
| Image height | 3.00 | 3.00 | 3.00 |
| Total lens length | 29.88 | 29.88 | 29.88 |
| BF | 2.52 | 5.13 | 7.74 |
| d6 | 0.10 | 2.76 | 5.42 |
| d11 | 3.95 | 1.96 | 0.11 |
| d14 | 5.12 | 2.38 | 0.09 |
| d17 | 2.18 | 1.64 | 0.50 |
| d21 | 1.86 | 4.47 | 7.08 |
| Entrance pupil position | 6.17 | 9.65 | 15.64 |
| Exit pupil position | −8.22 | −8.73 | −9.64 |
| Front principal point position | 8.34 | 10.01 | −1.78 |
| Rear principal point position | −3.58 | −8.35 | −18.80 |

Zoom lens unit data

| Unit | Start surface | Focal length | Lens structure length | Front principal point position | Rear principal point position |
|---|---|---|---|---|---|
| L1 | 1 | 9.67 | 8.68 | 5.49 | 1.98 |
| L2 | 7 | −3.59 | 1.97 | 0.32 | −0.98 |
| L3 | 12 | 8.74 | 0.93 | 0.06 | −0.60 |
| L4 | 15 | 6.60 | 2.80 | 0.95 | −0.83 |
| L5 | 18 | −6.62 | 1.63 | 0.97 | −0.09 |
| G | 22 | ∞ | 0.25 | 0.08 | −0.08 |

Single lens data

| Lens | Start surface | Focal length |
|---|---|---|
| 1 | 1 | −15.69 |
| 2 | 3 | 0.00 |
| 3 | 5 | 7.57 |
| 4 | 7 | −5.95 |
| 5 | 9 | −3.83 |
| 6 | 10 | 6.52 |
| 7 | 12 | 8.74 |
| 8 | 15 | 4.27 |
| 9 | 16 | −11.38 |

-continued

[unit: mm]

| 10 | 18 | 12.54 |
|---|---|---|
| 11 | 20 | −4.32 |
| 12 | 22 | 0.00 |

[Numerical Value Embodiment 2]

[unit: mm]

Surface data

| Surface number | r | d | nd | vd | Effective diameter |
|---|---|---|---|---|---|
| 1 | −149.866 | 0.30 | 2.00069 | 25.5 | 8.13 |
| 2 | 17.285 | 0.58 |  |  | 7.66 |
| 3 | ∞ | 6.20 | 2.00100 | 29.1 | 7.54 |
| 4 | ∞ | 0.10 |  |  | 5.31 |
| 5* | 6.688 | 1.52 | 1.59201 | 67.0 | 5.09 |
| 6* | −10.425 | (variable) |  |  | 4.68 |
| 7* | −28.489 | 0.30 | 1.80139 | 45.5 | 3.77 |
| 8* | 5.027 | 0.54 |  |  | 3.30 |
| 9 | −9.631 | 0.30 | 1.80610 | 40.9 | 3.20 |
| 10 | 5.380 | 0.82 | 1.95906 | 17.5 | 3.04 |
| 11 | 31.667 | (variable) |  |  | 2.86 |
| 12* | 4.242 | 0.80 | 1.49710 | 81.6 | 2.54 |
| 13 | 25.217 | 0.13 |  |  | 2.52 |
| 14(stop) | ∞ | (variable) |  |  | 2.53 |
| 15* | 9.096 | 2.10 | 1.61881 | 63.9 | 4.97 |
| 16 | −3.921 | 0.10 |  |  | 5.14 |
| 17 | −3.720 | 0.30 | 1.95906 | 17.5 | 5.07 |
| 18 | −5.037 | (variable) |  |  | 5.34 |
| 19 | −43.062 | 1.30 | 1.80809 | 22.8 | 4.61 |
| 20 | −5.633 | 0.10 |  |  | 4.57 |
| 21 | −7.406 | 0.30 | 1.90270 | 31.0 | 4.30 |
| 22* | 6.553 | (variable) |  |  | 4.14 |
| 23 | ∞ | 0.25 | 1.51633 | 64.1 | 8.00 |
| 24 | ∞ | 0.50 |  |  | 8.00 |
| Image plane | ∞ |  |  |  |  |

Aspheric surface data

5th surface

K = 0.00000e+000
A4 = −4.08282e−004
A6 = −4.13059e−007

6th surface

K = 0.00000e+000
A4 = 6.27962e−004
A6 = −1.67401e−006

7th surface

K = 0.00000e+000
A4 = −7.69901e−005

8th surface

K = 0.00000e+000
A4 = −7.82910e−004

12th surface

K = 0.00000e+000
A4 = −2.41136e−003
A6 = −8.84533e−005

15th surface

K = 0.00000e+000
A4 = −2.14344e−003
A6 = 2.10727e−006

-continued

[unit: mm]

22th surface

K = 0.00000e+000
A4 = 3.07832e−003
A6 = 1.08571e−004
A8 = 2.18915e−005

Various data
Zoom ratio 4.76

|  | Wide angle | Middle | Telephoto |
|---|---|---|---|
| Focal length | 4.09 | 9.22 | 19.51 |
| F-NUMBER | 3.60 | 4.84 | 5.78 |
| Half angle of view (deg) | 29.93 | 29.93 | 29.93 |
| Image height | 2.64 | 5.54 | 8.41 |
| Total lens length | 29.94 | 29.94 | 29.94 |
| BF | 2.65 | 5.55 | 8.42 |
| d6 | 0.10 | 2.23 | 4.36 |
| d11 | 3.94 | 1.82 | 0.10 |
| d14 | 4.50 | 2.20 | 0.10 |
| d18 | 2.96 | 2.35 | 1.17 |
| d22 | 1.98 | 4.88 | 7.75 |
| Entrance pupil position | 6.21 | 8.88 | 12.98 |
| Exit pupil position | −8.39 | −9.35 | −10.57 |
| Front principal point position | 8.42 | 9.48 | −1.91 |
| Rear principal point position | −3.59 | −8.72 | −19.01 |

Zoom lens unit data

| Unit | Start surface | Focal length | Lens structure length | Front principal point position | Rear principal point position |
|---|---|---|---|---|---|
| L1 | 1 | 8.79 | 8.70 | 5.29 | 1.77 |
| L2 | 7 | −3.49 | 1.96 | 0.36 | −0.90 |
| L3 | 12 | 10.13 | 0.93 | −0.11 | −0.77 |
| L4 | 15 | 6.56 | 2.50 | 0.95 | −0.70 |
| L5 | 19 | −7.51 | 1.70 | 0.96 | −0.00 |
| G | 23 | ∞ | 0.25 | 0.08 | −0.08 |

Single lens data

| Lens | Start surface | Focal length |
|---|---|---|
| 1 | 1 | −15.47 |
| 2 | 3 | 0.00 |
| 3 | 5 | 7.12 |
| 4 | 7 | −5.31 |
| 5 | 9 | −4.24 |
| 6 | 10 | 6.66 |
| 7 | 12 | 10.13 |
| 8 | 15 | 4.72 |
| 9 | 17 | −16.70 |
| 10 | 19 | 7.90 |
| 11 | 21 | −3.81 |
| 12 | 23 | 0.00 |

[Numerical Value Embodiment 3]

[unit: mm]

Surface data

| Surface number | r | d | nd | vd | Effective diameter |
|---|---|---|---|---|---|
| 1 | 15.075 | 0.30 | 2.00272 | 19.3 | 7.30 |
| 2 | 6.637 | 1.00 |  |  | 6.60 |
| 3 | ∞ | 5.00 | 2.10205 | 16.8 | 6.50 |
| 4 | ∞ | 0.10 |  |  | 5.55 |
| 5* | 8.027 | 1.52 | 1.80400 | 46.6 | 5.65 |
| 6* | −17.264 | (variable) |  |  | 5.47 |
| 7* | −6.787 | 0.30 | 1.85135 | 40.1 | 3.25 |
| 8* | 5.218 | 0.35 |  |  | 2.90 |
| 9 | −21.265 | 0.30 | 1.83481 | 42.7 | 2.86 |
| 10 | 5.268 | 0.90 | 1.92286 | 18.9 | 2.77 |
| 11 | −23.349 | (variable) |  |  | 2.64 |
| 12* | 6.845 | 1.10 | 1.49710 | 81.6 | 2.63 |
| 13 | −5.080 | 0.30 | 1.91082 | 35.3 | 2.75 |
| 14 | −11.554 | (variable) |  |  | 2.92 |
| 15* | 15.525 | 2.00 | 1.55332 | 71.7 | 6.21 |
| 16 | −9.064 | 0.10 |  |  | 6.51 |
| 17 | 16.444 | 2.30 | 1.53775 | 74.7 | 6.51 |
| 18 | −6.913 | 0.30 | 2.00069 | 25.5 | 6.34 |
| 19 | −10.927 | (variable) |  |  | 6.41 |
| 20 | 58.443 | 1.20 | 1.69895 | 30.1 | 4.97 |
| 21 | −7.437 | 0.30 | 1.90270 | 31.0 | 4.78 |
| 22* | 9.142 | (variable) |  |  | 4.63 |
| 23 | ∞ | 0.25 | 1.51633 | 64.1 | 8.00 |
| 24 | ∞ | 0.50 |  |  | 8.00 |
| Image plane | ∞ |  |  |  |  |

Aspheric surface data

5th surface

K = 0.00000e+000
A4 = −1.88037e−004
A6 = −1.73403e−007
A8 = −1.05807e−007

6th surface

K = 0.00000e+000
A4 = 9.29714e−005

7th surface

K = 0.00000e+000
A4 = 2.44483e−003

8th surface

K = 0.00000e+000
A4 = −1.09850e−003
A6 = 2.74774e−004
A8 = −2.71004e−005

12th surface

K = 0.00000e+000
A4 = −1.00335e−003
A6 = 4.77786e−005

15th surface

K = 0.00000e+000
A4 = −6.49254e−004
A6 = 5.34648e−006
A8 = −1.70166e−007

22th surface

K = 0.00000e+000
A4 = 8.18814e−004
A6 = 4.71103e−005
A8 = −4.48221e−006

-continued

[unit: mm]

Various data
Zoom ratio 4.72

|  | Wide angle | Middle | Telephoto |
|---|---|---|---|
| Focal length | 4.10 | 9.27 | 19.35 |
| F-NUMBER | 3.62 | 4.80 | 5.75 |
| Half angle of view (deg) | 33.36 | 17.94 | 8.81 |
| Image height | 2.70 | 3.00 | 3.00 |
| Total lens length | 33.00 | 33.00 | 33.00 |
| BF | 3.34 | 5.84 | 8.34 |
| d6 | 0.30 | 2.99 | 5.67 |
| d11 | 3.74 | 1.58 | 0.30 |
| d14 | 5.19 | 2.48 | 0.09 |
| d19 | 3.06 | 2.73 | 1.23 |
| d22 | 2.68 | 5.18 | 7.68 |
| Entrance pupil position | 5.38 | 8.19 | 13.28 |
| Exit pupil position | −12.50 | −11.49 | −11.89 |
| Front principal point position | 8.19 | 10.29 | 2.41 |
| Rear principal point position | −3.60 | −8.77 | −18.85 |

Zoom lens unit data

| Unit | Start surface | Focal length | Lens structure length | Front principal point position | Rear principal point position |
|---|---|---|---|---|---|
| L1 | 1 | 9.72 | 7.92 | 5.32 | 2.34 |
| L2 | 7 | −3.79 | 1.85 | −0.04 | −1.24 |
| L3 | 12 | 14.24 | 1.40 | 0.16 | −0.75 |
| L4 | 15 | 7.02 | 4.70 | 1.43 | −1.77 |
| L5 | 20 | −8.82 | 1.50 | 0.93 | 0.05 |
| G | 23 | ∞ | 0.25 | 0.08 | −0.08 |

Single lens data

| Lens | Start surface | Focal length |
|---|---|---|
| 1 | 1 | −12.04 |
| 2 | 3 | 0.00 |
| 3 | 5 | 7.00 |
| 4 | 7 | −3.43 |
| 5 | 9 | −5.03 |
| 6 | 10 | 4.73 |
| 7 | 12 | 6.05 |
| 8 | 13 | −10.18 |
| 9 | 15 | 10.65 |
| 10 | 17 | 9.37 |
| 11 | 18 | −19.53 |
| 12 | 20 | 9.51 |
| 13 | 21 | −4.50 |
| 14 | 23 | 0.00 |

[Numerical Value Embodiment 4]

[unit: mm]

Surface data

| Surface number | r | d | nd | vd | Effective diameter |
|---|---|---|---|---|---|
| 1 | 22.388 | 0.30 | 2.00069 | 25.5 | 6.80 |
| 2 | 5.762 | 0.90 |  |  | 6.03 |
| 3 | ∞ | 5.00 | 2.00100 | 29.1 | 6.00 |
| 4 | ∞ | 0.10 |  |  | 5.07 |
| 5* | 7.127 | 1.80 | 1.62263 | 58.2 | 5.13 |
| 6* | −8.200 | (variable) |  |  | 5.04 |
| 7* | −7.049 | 0.30 | 1.85135 | 40.1 | 3.28 |
| 8* | 6.645 | 0.28 |  |  | 3.01 |
| 9 | −58.253 | 0.30 | 1.88300 | 40.8 | 2.98 |
| 10 | 6.064 | 1.00 | 1.89286 | 20.4 | 2.89 |
| 11 | −31.609 | (variable) |  |  | 2.75 |
| 12* | 8.526 | 0.80 | 1.49710 | 81.6 | 3.02 |
| 13 | 896.594 | 0.00 |  |  | 3.05 |
| 14 | ∞ | (variable) |  |  | 3.05 |
| 15* | 9.863 | 2.10 | 1.55332 | 71.7 | 6.00 |
| 16 | −13.251 | 2.58 |  |  | 6.15 |
| 17 | 11.427 | 2.30 | 1.49700 | 81.5 | 5.88 |
| 18 | −5.084 | 0.30 | 2.00272 | 19.3 | 5.63 |
| 19 | −9.999 | (variable) |  |  | 5.75 |
| 20 | −16.745 | 1.70 | 1.76182 | 26.5 | 4.77 |
| 21 | −4.301 | 0.30 | 1.85135 | 40.1 | 4.74 |
| 22* | 17.954 | (variable) |  |  | 4.79 |
| 23 | ∞ | 0.25 | 1.51633 | 64.1 | 8.00 |
| 24 | ∞ | 0.50 |  |  | 8.00 |
| Image plane | ∞ |  |  |  |  |

Aspheric surface data

5th surface

K = 0.00000e+000
A4 = −4.65364e−004
A6 = −1.89040e−005
A8 = 8.57680e−007

6th surface

K = 0.00000e+000
A4 = 3.25584e−004

7th surface

K = 0.00000e+000
A4 = 7.91545e−004

8th surface

K = 0.00000e+000
A4 = −1.06421e−003
A6 = −1.65978e−004
A8 = 3.57188e−005

12th surface

K = 0.00000e+000
A4 = −5.99235e−004
A6 = −6.37234e−005
A8 = 6.42978e−006

15th surface

K = 0.00000e+000
A4 = −2.25397e−004
A6 = 1.50714e−005
A8 = −5.01850e−007

22th surface

K = 0.00000e+000
A4 = 6.11527e−004
A6 = 6.28369e−005
A8 = −3.97754e−006

Various data
Zoom ratio 4.72

|  | Wide angle | Middle | Telephoto |
|---|---|---|---|
| Focal length | 4.11 | 9.09 | 19.41 |
| F-NUMBER | 3.63 | 4.95 | 6.42 |
| Half angle of view (deg) | 36.13 | 18.26 | 8.79 |
| Image height | 3.00 | 3.00 | 3.00 |
| Total lens length | 34.79 | 34.79 | 34.79 |
| BF | 2.19 | 4.66 | 7.12 |
| d6 | 0.30 | 3.09 | 5.89 |
| d11 | 4.39 | 2.18 | 0.30 |
| d14 | 4.97 | 2.22 | 0.08 |

-continued

[unit: mm]

| | | | |
|---|---|---|---|
| d19 | 2.88 | 2.58 | 1.35 |
| d22 | 1.53 | 4.00 | 6.46 |
| Entrance pupil position | 4.77 | 6.92 | 10.10 |
| Exit pupil position | −10.06 | −10.50 | −11.70 |
| Front principal point position | 7.28 | 8.49 | −1.37 |
| Rear principal point position | −3.61 | −8.59 | −18.91 |

Zoom lens unit data

| Unit | Start surface | Focal length | Lens structure length | Front principal point position | Rear principal point position |
|---|---|---|---|---|---|
| L1 | 1 | 9.29 | 8.10 | 5.98 | 4.11 |
| L2 | 7 | −4.35 | 1.88 | −0.03 | −1.18 |
| L3 | 12 | 17.31 | 0.80 | −0.01 | −0.54 |
| L4 | 15 | 8.10 | 7.28 | 1.98 | −4.23 |
| L5 | 20 | −8.53 | 2.00 | 0.63 | −0.47 |
| G | 23 | ∞ | 0.25 | 0.08 | −0.08 |

Single lens data

| Lens | Start surface | Focal length |
|---|---|---|
| 1 | 1 | −7.83 |
| 2 | 3 | 0.00 |
| 3 | 5 | 6.41 |
| 4 | 7 | −3.98 |
| 5 | 9 | −6.21 |
| 6 | 10 | 5.77 |
| 7 | 12 | 17.31 |
| 8 | 15 | 10.56 |
| 9 | 17 | 7.42 |
| 10 | 18 | −10.64 |
| 11 | 20 | 7.17 |
| 12 | 21 | −4.05 |
| 13 | 23 | 0.00 |

[Numerical Value Embodiment 5]

[unit: mm]

Surface data

| Surface number | r | d | nd | vd | Effective diameter |
|---|---|---|---|---|---|
| 1 | 26.169 | 0.30 | 2.00069 | 25.5 | 6.80 |
| 2 | 5.763 | 0.90 | | | 6.03 |
| 3 | ∞ | 5.00 | 2.00100 | 29.1 | 6.00 |
| 4 | ∞ | 0.10 | | | 5.20 |
| 5 | 9.180 | 0.90 | 1.53775 | 74.7 | 5.11 |
| 6 | 42.587 | 0.10 | | | 5.10 |
| 7* | 14.000 | 1.30 | 1.67790 | 54.9 | 5.12 |
| 8 | −9.667 | (variable) | | | 5.04 |
| 9* | −6.690 | 0.30 | 1.85135 | 40.1 | 3.25 |
| 10* | 6.414 | 0.21 | | | 3.00 |
| 11 | 47.577 | 0.30 | 1.88300 | 40.8 | 2.98 |
| 12 | 5.429 | 0.80 | 1.89286 | 20.4 | 2.89 |
| 13 | −80.039 | (variable) | | | 2.77 |
| 14* | 8.493 | 0.80 | 1.49710 | 81.6 | 3.07 |
| 15 | −1920.830 | 0.00 | | | 3.11 |
| 16 | ∞ | (variable) | | | 3.11 |
| 17* | 8.745 | 2.10 | 1.55332 | 71.7 | 6.00 |
| 18 | −14.272 | 2.56 | | | 6.10 |
| 19 | 10.759 | 2.50 | 1.49700 | 81.5 | 5.70 |
| 20 | −4.822 | 0.30 | 2.00272 | 19.3 | 5.36 |
| 21 | −10.591 | (variable) | | | 5.47 |
| 22 | −14.936 | 1.70 | 1.76182 | 26.5 | 4.69 |
| 23 | −4.073 | 0.30 | 1.85135 | 40.1 | 4.69 |
| 24* | 20.586 | (variable) | | | 4.78 |
| 25 | ∞ | 0.25 | 1.51633 | 64.1 | 8.00 |
| 26 | ∞ | 0.50 | | | 8.00 |
| Image plane | ∞ | | | | |

Aspheric surface data

7th surface

K = 0.00000e+000
A4 = −4.13629e−004
A6 = −1.26790e−005
A8 = 4.68697e−007

9th surface

K = 0.00000e+000
A4 = 1.38303e−003

10th surface

K = 0.00000e+000
A4 = −7.16577e−004
A6 = −1.56674e−004
A8 = 3.93776e−005

14th surface

K = 0.00000e+000
A4 = −6.51136e−004
A6 = −5.94288e−005
A8 = 8.68068e−006

17th surface

K = 0.00000e+000
A4 = −2.22823e−004
A6 = 1.63660e−005
A8 = −6.21344e−007

24th surface

K = 0.00000e+000
A4 = 6.40087e−004
A6 = 6.41570e−005
A8 = −6.52481e−006

Various data
Zoom ratio 4.73

| | Wide angle | Middle | Telephoto |
|---|---|---|---|
| Focal length | 4.08 | 9.03 | 19.29 |
| F-NUMBER | 3.60 | 4.90 | 6.26 |
| Half angle of view (deg) | 33.50 | 18.39 | 8.84 |
| Image height | 2.70 | 3.00 | 3.00 |
| Total lens length | 34.72 | 34.72 | 34.72 |
| BF | 2.08 | 4.47 | 6.86 |
| d 8 | 0.30 | 3.21 | 6.12 |
| d13 | 4.50 | 2.36 | 0.30 |
| d16 | 4.79 | 1.98 | 0.10 |
| d21 | 2.57 | 2.22 | 0.87 |
| d24 | 1.42 | 3.81 | 6.20 |
| Entrance pupil position | 4.75 | 6.87 | 9.87 |
| Exit pupil position | −9.44 | −9.99 | −11.26 |
| Front principal point position | 7.16 | 8.14 | −2.48 |
| Rear principal point position | −3.58 | −8.53 | −18.79 |

Zoom lens unit data

| Unit | Start surface | Focal length | Lens structure length | Front principal point position | Rear principal point position |
|---|---|---|---|---|---|
| L1 | 1 | 9.09 | 8.60 | 6.22 | 4.51 |
| L2 | 9 | −4.40 | 1.61 | 0.01 | −0.96 |

-continued

[unit: mm]

| | | | | | |
|---|---|---|---|---|---|
| L3 | 14 | 17.01 | 0.80 | 0.00 | −0.53 |
| L4 | 17 | 8.09 | 7.46 | 1.57 | −4.59 |
| L5 | 22 | −8.48 | 2.00 | 0.58 | −0.52 |
| G | 25 | ∞ | 0.25 | 0.08 | −0.08 |

Single lens data

| Lens | Start surface | Focal length |
|---|---|---|
| 1 | 1 | −7.44 |
| 2 | 3 | 0.00 |
| 3 | 5 | 21.56 |
| 4 | 7 | 8.63 |
| 5 | 9 | −3.81 |
| 6 | 11 | −6.96 |
| 7 | 12 | 5.72 |
| 8 | 14 | 17.01 |
| 9 | 17 | 10.13 |
| 10 | 19 | 7.08 |
| 11 | 20 | −9.06 |
| 12 | 22 | 6.88 |
| 13 | 23 | −3.97 |
| 14 | 25 | 0.00 |

TABLE 1

| Cond. Exp. | Lower limit | Upper limit | Embodiment 1 | 2 | 3 | 4 | 5 |
|---|---|---|---|---|---|---|---|
| (1) | 2.0 | 5.0 | 3.609 | 2.617 | 2.741 | 2.302 | 2.539 |
| (2) | 0.5 | 2.0 | 1.268 | 1.301 | 1.765 | 1.728 | 1.776 |
| (3) | 1.9 | 2.6 | 2.369 | 2.154 | 2.383 | 2.278 | 2.229 |
| (4) | 0.6 | 1.4 | 0.881 | 0.857 | 0.928 | 1.065 | 1.079 |
| (5) | 1.8 | 3.0 | 2.689 | 2.514 | 2.567 | 2.139 | 2.066 |
| (6) | 0.1 | 0.6 | 0.343 | 0.386 | 0.457 | 0.442 | 0.439 |
| (7) | 0.5 | 10.0 | 1.582 | 1.760 | 2.084 | 2.073 | 2.073 |
| (8) | −1.0 | −0.02 | −0.362 | −0.103 | −0.474 | −0.368 | −0.396 |
| (9) | 0.1 | 0.6 | 0.450 | 0.447 | 0.410 | 0.417 | 0.444 |
| (10) | 1.8 | 2.5 | 1.911 | 2.001 | 2.102 | 2.001 | 2.001 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-141002, filed Jul. 19, 2016, which is hereby incorporated by reference herein in its entirety.

What is claimed is:

1. A zoom lens comprising, in order from an object side to an image side: a first lens unit having a positive refractive power, a second lens unit having a negative refractive power, a third lens unit having a positive refractive power, a fourth lens unit having a positive refractive power, and a fifth lens unit having a negative refractive power, wherein the first lens unit does not move for zooming, each of the distances between the lens units adjacent to each other is changed during zooming, and when a magnification amount Z2 of the second lens unit, a magnification amount Z3 of the third lens unit, and a magnification amount Z4 of the fourth lens unit are given by $$Z2=\beta 2t/\beta 2w,$$

$$Z3=\beta 3t/\beta 3w, \text{ and}$$

$$Z4=\beta 4t/\beta 4w,$$

where $\beta 2w$ and $\beta 2t$ are respectively lateral magnifications of the second lens unit focused at infinity at a wide angle end and a telephoto end, $\beta 3w$ and $\beta 3t$ are respectively lateral magnifications of the third lens unit focused at infinity at the wide angle end and the telephoto end, and $\beta 4w$ and $\beta 4t$ are respectively lateral magnifications of the fourth lens unit focused at infinity at the wide angle end and the telephoto end, wherein the conditional expressions are satisfied:

$$2.0<Z2/(Z3\times Z4)<5.0, \text{ and}$$

$$0.5<|f5|/M5<2.0$$

where f5 is a focal length of the fifth lens unit, and M5 is an amount of movement of the fifth lens unit in zooming from the wide angle end to the telephoto end while focused at infinity.

2. The zoom lens according to claim 1, wherein the following conditional expression is satisfied:

$$1.9<f1/fw<2.6$$

where f1 is a focal length of the first lens unit, and fw is a focal length of the zoom lens at the wide angle end.

3. The zoom lens according to claim 1, wherein the following conditional expression is satisfied:

$$0.6<|f2|/fw<1.4$$

where f2 is a focal length of the second lens unit, and fw is a focal length of the zoom lens at the wide angle end.

4. The zoom lens according to claim 1, wherein the following conditional expression is satisfied:

$$1.8<f1/|f2|<3.0$$

where f1 is a focal length of the first lens unit, and f2 is a focal length of the second lens unit.

5. The zoom lens according to claim 1, wherein the following conditional expression is satisfied:

$$0.1<|f5|/ft<0.6$$

where ft is a focal length of the zoom lens at the telephoto end.

6. The zoom lens according to claim 1, wherein the following conditional expression is satisfied:

$$0.5<100\times(D23t+D34t)/ft<10.0$$

where D23t is a distance between the second lens unit and the third lens unit focused at infinity at the telephoto end, D34t is a distance between the third lens unit and the fourth lens unit focused at infinity at the telephoto end, and ft is a focal length of the zoom lens at the telephoto end.

7. The zoom lens according to claim 1, wherein the third lens unit moves during zooming.

8. The zoom lens according to claim 7, wherein the third lens unit is located closer to the object side at the wide angle end than at the telephoto end.

9. The zoom lens according to claim 7, wherein the following conditional expression is satisfied:

$$-1.00<M3/fw<-0.02$$

where M3 is an amount of movement of the third lens unit in zooming from the wide angle end to the telephoto end, and fw is a focal length of the zoom lens at the wide angle end.

10. The zoom lens according to claim 1, wherein the first lens unit includes a reflective member having a reflective surface that bends an optical path.

11. The zoom lens according to claim 10, wherein the following conditional expression is satisfied:

$$0.1 < D1/ft < 0.6$$

where D1 is a thickness of the first lens unit, and ft is a focal length of the zoom lens at the telephoto end.

12. The zoom lens according to claim 10, wherein the reflective member comprises a prism.

13. The zoom lens according to claim 12, wherein the following conditional expression is satisfied:

$$1.8 < Ndpr < 2.5$$

where Ndpr is a refractive index, for d-line, of a material of the prism.

14. An image pickup apparatus comprising: a zoom lens comprising, in order from an object side to an image side: a first lens unit having a positive refractive power, a second lens unit having a negative refractive power, a third lens unit having a positive refractive power, a fourth lens unit having a positive refractive power, and a fifth lens unit having a negative refractive power, wherein
the first lens unit does not move for zooming,
each of the distances between the lens units adjacent to each other is changed during zooming, and
when a magnification amount Z2 of the second lens unit, a magnification amount Z3 of the third lens unit, and a magnification amount Z4 of the fourth lens unit are given by $$Z2 = \beta 2t/\beta 2w,$$

$$Z3 = \beta 3t/\beta 3w, \text{ and}$$

$$Z4 = \beta 4t/\beta 4w,$$

where $\beta 2w$ and $\beta 2t$ are respectively lateral magnifications of the second lens unit focused at infinity at a wide angle end and a telephoto end, $\beta 3w$ and $\beta 3t$ are respectively lateral magnifications of the third lens unit focused at infinity at the wide angle end and the telephoto end, and $\beta 4w$ and $\beta 4t$ are respectively lateral magnifications of the fourth lens unit focused at infinity at the wide angle end and the telephoto end, wherein the conditional expressions are satisfied:

$$2.0 < Z2/(Z3 \times Z4) < 5.0, \text{ and}$$

$$0.5 < |f5|/M5 < 2.0$$

where f5 is a focal length of the fifth lens unit, and M5 is an amount of movement of the fifth lens unit in zooming from the wide angle end to the telephoto end while focused at infinity; and a solid-state image pickup element that receives an image formed by the zoom lens.

* * * * *